US 11,008,908 B2

(12) United States Patent
Kataoka et al.

(10) Patent No.: US 11,008,908 B2
(45) Date of Patent: May 18, 2021

(54) OIL PASSAGEWAY STRUCTURE FOR INTERNAL COMBUSTION ENGINES

(71) Applicant: HONDA MOTOR CO., LTD., Tokyo (JP)

(72) Inventors: Dai Kataoka, Wako (JP); Hiroatsu Inui, Wako (JP); Yoshihiro Takada, Wako (JP); Takahiro Iwama, Wako (JP); Masaki Cho, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 197 days.

(21) Appl. No.: 16/364,435

(22) Filed: Mar. 26, 2019

(65) Prior Publication Data
US 2019/0301318 A1    Oct. 3, 2019

(30) Foreign Application Priority Data

Mar. 29, 2018  (JP) .............................. JP2018-065352
Nov. 5, 2018   (JP) .............................. JP2018-207933

(51) Int. Cl.
   *F01M 11/02*   (2006.01)
   *F01M 1/04*    (2006.01)
   (Continued)

(52) U.S. Cl.
   CPC .............. *F01M 11/02* (2013.01); *F01M 1/04* (2013.01); *F01M 9/102* (2013.01);
   (Continued)

(58) Field of Classification Search
   CPC .......... F01M 11/02; F01M 9/102; F01M 1/02; F01M 1/04; F01M 1/06; F01M 2011/023;
   (Continued)

(56) References Cited

U.S. PATENT DOCUMENTS 5,522,354 A * 6/1996 Sakamoto ............. F01L 1/0532
                                              123/193.5
5,887,557 A * 3/1999 Battlogg ................. F01L 1/047
                                              123/90.17
(Continued)

FOREIGN PATENT DOCUMENTS

JP    61261613 A  * 11/1986
JP    62-49604 U     3/1987
(Continued)

OTHER PUBLICATIONS

Machine translation, JP07-030890, Takahashi et al., obtained from https://www.j-platpat.inpit.go.jp/, published Jul. 19, 199995, pp. 1-7. (Year: 1995).*
(Continued)

*Primary Examiner* — Grant Moubry
(74) *Attorney, Agent, or Firm* — Birch, Stewart, Kolasch & Birch, LLP

(57) ABSTRACT

An oil passageway structure for internal combustion engines includes a cylinder head having an inter-bearing wall fluid communication oil passage for providing fluid communication between a plurality of bearing walls to allow oil to flow therebetween. The cylinder head further includes a bearing wall oil passage branched from the inter-bearing wall fluid communication oil passage to supply oil to a bearing surfaces of at least one of the bearing walls. The inter-bearing wall fluid communication oil passage is defined in one of facing side walls. The bearing wall oil passageway is defined in at least one of the bearing walls. The oil passageway structure is thus made up of a reduced number of parts, can be assembled with a reduced number of man-hours, can lead to productivity growth, and is inexpensive to manufacture.

13 Claims, 28 Drawing Sheets

(51) Int. Cl.
  *F01M 9/10*   (2006.01)
  *F01P 3/02*   (2006.01)
  *F01P 3/00*   (2006.01)
(52) U.S. Cl.
  CPC .. *F01M 2011/021* (2013.01); *F01M 2011/023* (2013.01); *F01P 2003/006* (2013.01); *F01P 2003/021* (2013.01)
(58) Field of Classification Search
  CPC .......... F01M 2011/021; F01P 2003/021; F01P 2003/006; F16N 39/00
  See application file for complete search history.

(56) References Cited

U.S. PATENT DOCUMENTS

| | | | | |
|---|---|---|---|---|
| 6,182,623 B1* | 2/2001 | Sugie | ...................... | F01L 1/024 123/90.17 |
| 6,470,840 B1* | 10/2002 | Ebesu | ..................... | F01L 1/024 123/90.16 |
| 6,951,148 B2* | 10/2005 | Battlogg | ................... | F01L 1/04 123/90.16 |
| 8,387,576 B2* | 3/2013 | Iwata | .................... | F01L 1/3442 123/90.17 |
| 9,797,280 B2* | 10/2017 | Beyer | ...................... | F01M 1/02 |
| 9,810,112 B2* | 11/2017 | Hikita | ...................... | F01M 1/06 |
| 2017/0138233 A1* | 5/2017 | Kawahara | .............. | F01M 11/02 |

FOREIGN PATENT DOCUMENTS

| | | |
|---|---|---|
| JP | 1-136609 U | 9/1989 |
| JP | 2000-87716 A | 3/2000 |
| JP | 2017-180401 A | 10/2017 |

OTHER PUBLICATIONS

Japanese Office Action for Japanese Application No. 2018-207933, dated Jun. 30, 2020, with English translation.

* cited by examiner

OIL PASSAGEWAY STRUCTURE FOR INTERNAL COMBUSTION ENGINES

TECHNICAL FIELD

The present invention relates to an oil passageway structure for internal combustion engines which has oil passageways for supplying lubricating oil that are defined in the bearing surfaces of bearing walls by which camshafts in a cylinder head are rotatably supported.

BACKGROUND ART

Some internal combustion engines have an engine body including a cylinder block and a cylinder head that are stacked obliquely upward on and fastened to a crankcase and that are inclined forward of vehicles on which the internal combustion engines are mounted. In such an internal combustion engine, camshafts of an engine valve operating mechanism are usually rotatably supported on and sandwiched between the cylinder head or the cylinder block and a camshaft holder.

According to a conventional example, e.g., Patent Document 1, see below, bearing walls and bearing surfaces of the camshaft holder by which journals of the camshafts are rotatably supported are supplied with lubricating oil through oil passageways that are defined in the camshaft holder.

PRIOR ART DOCUMENT

Patent Document

[Patent Document 1]
JP S62-49604 A

In the internal combustion engine disclosed in Patent Document 1, engine valve operating camshafts are sandwiched between and rotatably supported on a cylinder block and bearing caps, i.e., a camshaft holder, in a cylinder head.

Rocker arm shafts of the engine valve operating mechanism is also rotatably supported on the bearing caps. Lubricating oil is supplied from an oil passageway defined axially centrally in each of the rocker arm shafts to bearing surfaces of the bearing caps through oil supply passages in the bearing caps.

SUMMARY OF THE INVENTION

Underlying Problems to be Solved by the Invention

According to Patent Document 1, the oil passageways that are formed in separate members such as the bearing caps that are mounted in the cylinder head or the cylinder block are used to supply lubricating oil to the bearings for the camshafts. The oil passageways that are formed in the separate members have joints that are required to be sealed to prevent lubricating oil from leaking therefrom.

Consequently, the number of parts used and the number of man-hours for assembling them are increased, productivity is lowered, and costs are pushed up because of the need for sealing the joints.

The present invention has been made in view of the above difficulties. It is an object of the present invention to provide an oil passageway structure for internal combustion engines which is made up of a reduced number of parts, can be assembled with a reduced number of man-hours, can lead to productivity growth, and is less costly to manufacture.

Means to Solve the Problems

To accomplish the above object, the present invention provides an oil passageway structure for an internal combustion engine having an engine body including a cylinder head superposed on a cylinder block mounted on and extending upward from a crankcase and integrally fastened to the cylinder block, at least two bearing walls extending between two facing side walls of the cylinder head, a valve operating mechanism having camshafts rotatably supported by the bearing walls, and oil passages defined in the engine body to supply oil to bearing surfaces of the bearing walls of the cylinder head, wherein:

the cylinder head has an inter-bearing wall fluid communication oil passage providing fluid communication between the bearing walls for allowing oil to flow therebetween, and a bearing wall oil passage branched from the inter-bearing wall fluid communication oil passage to supply oil to the bearing surface of at least one of the bearing walls; the inter-bearing wall fluid communication oil passage is defined in one of the facing side walls; and the bearing wall oil passageway is formed in at least one of the bearing walls.

With this arrangement, in the internal combustion engine in which the camshafts of the valve operating mechanism are rotatably supported by at least two bearing walls extending between the facing side walls of the cylinder head, the inter-bearing wall fluid communication oil passage that provides fluid communication between the bearing walls for allowing oil to flow therebetween is formed in one of the facing side walls, and the bearing wall oil passage branched from the inter-bearing wall fluid communication oil passage to supply oil to the bearing surface of at least one of the bearing walls is integrally formed in the bearing wall. Consequently, the oil passageway structure is free from oil leakage, can be made up of a reduced number of parts, can be assembled in a reduced number of man-hours, can be produced with increased productivity, and is low in cost.

According to a preferred embodiment, the inter-bearing wall fluid communication oil passageway is disposed below the bearing surfaces of the bearing wall.

With this arrangement, as the inter-bearing wall fluid communication oil passage is disposed below the bearing surfaces of the bearing wall, air that may have been introduced into the oil in the inter-bearing wall fluid communication oil passage can easily escape to the bearing surfaces.

According to a preferred embodiment of the invention, the one of the side walls in which the inter-bearing wall fluid communication oil passage is defined is opposite the other side wall from which an exhaust pipe extends.

With this arrangement, the one of the side walls in which the inter-bearing wall fluid communication oil passage is defined is opposite the side wall from which the exhaust pipe extends. Consequently, the oil in the inter-bearing wall fluid communication oil passage that is defined in the side wall opposite the side wall that tends to be heated to high temperatures by the exhaust pipe extending from the side wall, is prevented from being heated.

In a preferred embodiment the invention, the valve operating mechanism has two parallel camshafts rotatably supported as the camshafts by at least two of the bearing walls; a joint oil passageway tube extends from one of the side walls, in which the inter-bearing wall fluid communication oil passage is formed, to the other side wall, and is integrally formed with both the side walls; a joint oil passage is branched from the inter-bearing wall fluid communication oil passage and formed in the joint oil passage tube; a side wall oil passage extends from the joint oil passage to the bearing walls and is formed in the other side wall; the bearing wall oil passage functions as a first bearing wall oil passage; and a second bearing wall oil passage for supplying oil from the side wall oil passage to the bearing surface, adjacent to the other side wall, of the bearing wall is defined in the bearing wall.

With this arrangement, since the joint oil passage, the side wall oil passage, and the second bearing wall oil passage are integrally defined in the cylinder head, the oil passageway structure can be made up of a reduced number of parts, can be assembled in a reduced number of man-hours, and can be produced with increased productivity.

According to a preferred embodiment of the invention, the valve operating mechanism includes: camshafts rotatably mounted in the cylinder head and extending in leftward and rightward directions of a vehicle that incorporates the oil passageway structure; cam carriers including tubular members fitted axially slidably, but relatively non-rotatably, over the camshafts and having a plurality of axially adjacent cam lobes of different cam profiles, and tubular portions adjacent to the cam lobes on outer circumferential surfaces of the cam carriers; and cam switching mechanisms for axially moving the cam carriers to switch the cam lobes for acting on engine valves, and the joint oil passage tube is disposed below the tubular portions of the cam carriers.

With this arrangement, the valve operating mechanism is a variable valve operating mechanism including the camshafts, the cam carriers having the cam lobes of different cam profiles, and the cam switching mechanisms, and the joint oil passage tube is disposed below tubular portions adjacent to the cam lobes of the cam carriers. Consequently, the joint oil passage tube can be disposed closely to the cam carriers, and the internal combustion engine can be reduced in size by the effective utilization of space.

In a further preferred embodiment of the invention, the cylinder head includes an upper cylinder head member and a lower cylinder head member which are vertically split from each other; the upper cylinder head member has the bearing walls by which the camshafts as two parallel camshafts are rotatably supported; the upper cylinder head member and the lower cylinder head member have respective mating surfaces on the other side wall which is opposite the one of the side walls in which the inter-bearing wall fluid communication oil passage is formed, the mating surfaces having grooves defined therein which make up a second inter-bearing wall fluid communication oil passage providing fluid communication between the bearing walls for allowing oil to flow therebetween; and the bearing walls of the upper cylinder head member have second bearing wall oil passages defined therein which are branched from the second inter-bearing wall fluid communication oil passage to supply oil to the bearing surfaces of the bearing walls.

With this arrangement, for supplying oil to the bearing surfaces or first bearing surfaces and second bearing surfaces of the bearing walls of the upper cylinder head member by which the two parallel camshafts are rotatably supported, oil that has flowed through the inter-bearing wall fluid communication oil passage or first inter-bearing wall fluid communication oil passage and the bearing wall oil passage or first bearing wall oil passage is supplied to the first bearing surfaces, and oil that has flowed through the second inter-bearing wall fluid communication oil passage defined in the other side wall and the second bearing wall oil passage is supplied to the second bearing surfaces. Therefore, the first and second bearing surfaces of the bearing walls can be supplied with oil uniformly without localization and efficiently and lubricated thereby.

Since the grooves that make up the second inter-bearing wall fluid communication oil passage that provides fluid communication between the bearing walls for allowing oil to flow therebetween, are defined respectively in the mating surfaces of the upper cylinder head member and the lower cylinder head member, which are vertically split members, of the cylinder head, the grooves that make up the second inter-bearing wall fluid communication oil passage can be formed as grooves at the time the upper cylinder head member and the lower cylinder head member are cast. Therefore, the oil passageways can be formed with ease.

Effects of the Invention

According to the present invention, in the internal combustion engine in which the camshafts of the valve operating mechanism are rotatably supported by at least two bearing walls extending between the facing side walls of the cylinder head, the inter-bearing wall fluid communication oil passage that provides fluid communication between the bearing walls for allowing oil to flow therebetween is defined in one of the facing side walls, and the bearing wall oil passage branched from the inter-bearing wall fluid communication oil passage for supplying oil to the bearing surfaces of the bearing wall is defined in the bearing wall. Consequently, the oil passageway structure has few locations to be checked for oil leakage, can be made up of a reduced number of parts, can be assembled in a reduced number of man-hours, can be produced with increased productivity, and is low in cost.

MODES FOR CARRYING OUT THE INVENTION

An oil passageway structure for internal combustion engines according to a first embodiment of the present invention will hereinafter be described with reference to FIGS. 1 through 31.

Figure 1:
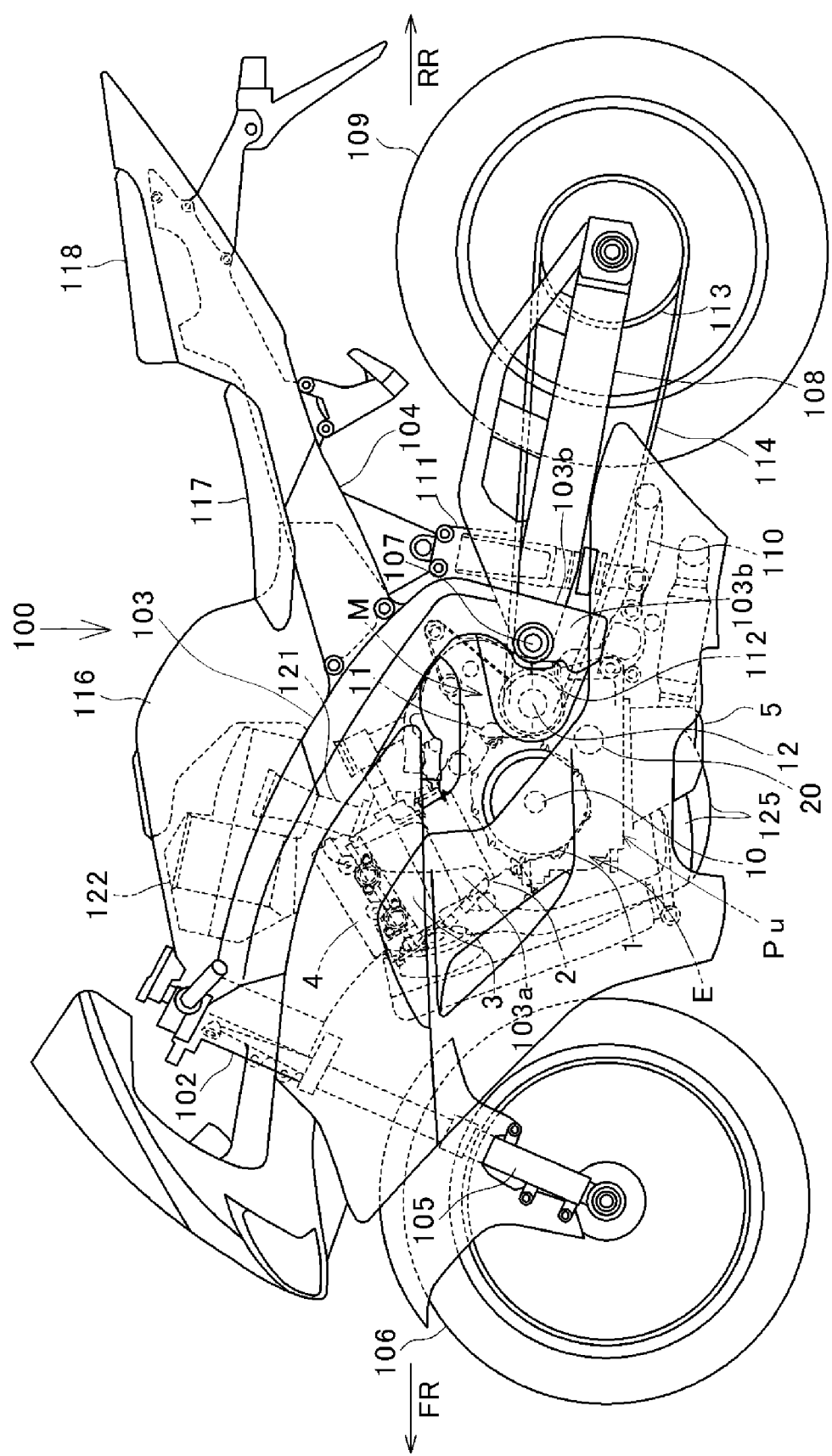
FIG. 1 is an overall side elevational view of a motorcycle including a power unit that incorporates an oil passageway structure for internal combustion engines according to an embodiment of the present invention.

FIG. 1 depicts in overall side elevation a two-wheel motorcycle 100, which is a saddle-type vehicle, including an internal combustion engine that incorporates the oil passageway structure according to the embodiment of the present invention.

In the description and the claims of the present invention, forward, rearward, leftward, rightward, and similar directional expressions are defined in accordance with the normal orientations of the motorcycle 100 according to the present embodiment that include a forward direction along which the motorcycle 100 moves straight ahead. In the drawings, the reference characters FR represent a forward direction, RR a rearward direction, LH a leftward direction, and RH a rightward direction.

The motorcycle 100 has a vehicle body frame including a pair of left and right main frames 103 branched leftward and rightward and extending obliquely rearward and downward from a head pipe 102 on which a front fork 105 with a front wheel 106 rotatably supported thereon is steerably supported.

Engine hangers 103a extend downward from front portions of the main frames 103. The main frames 103 have rear portions bent downward into respective pivot frames 103b.

Seat rails 104 are coupled to central portions of the main frames 103 closely to their rear ends and extend rearward therefrom.

Swing arms 108 have respective front ends pivotally supported on the pivot frames 103b by a pivot shaft 107. The swing arms 108 extend rearward and have respective rear ends on which a rear wheel 109 is rotatably supported by a rear axle.

A link mechanism 110 is connected between the swing arms 108 and the pivot frames 103b, and a rear cushion 111 is interposed between a portion of the link mechanism 110 and the seat rails 104.

A power unit Pu suspended from the vehicle body frame is supported between the engine hangers 103a and the pivot frames 103b of the main frames 103. The power unit Pu has an output shaft as a countershaft 12 of a transmission M in the power unit Pu. A drive chain 114 is trained around a drive sprocket 112 fitted over the output shaft of the power unit Pu and a driven sprocket 113 fitted over the axle of the rear wheel 109.

An air cleaner 122 is mounted on front halves of the main frames 103, and a fuel tank 116 is mounted on rear halves of the main frames 103. A main seat 117 and a pillion seat 118 are supported on the seat rails 104 behind the fuel tank 116.

The power unit Pu includes an internal combustion engine E disposed in a front portion thereof. The internal combustion engine E is a lateral-crankshaft in-line four-cylinder, water-cooled four-stroke internal combustion engine. The internal combustion engine E is mounted on the vehicle body frame with its cylinders inclined forward at an appropriate angle.

The internal combustion engine E has a crankshaft 10 oriented transversely, i.e., leftward and rightward, across the vehicle body frame and rotatably supported by a crankcase 1. The crankcase 1 is integrally combined with a transmission M disposed behind the crankshaft 10.

Figure 2:
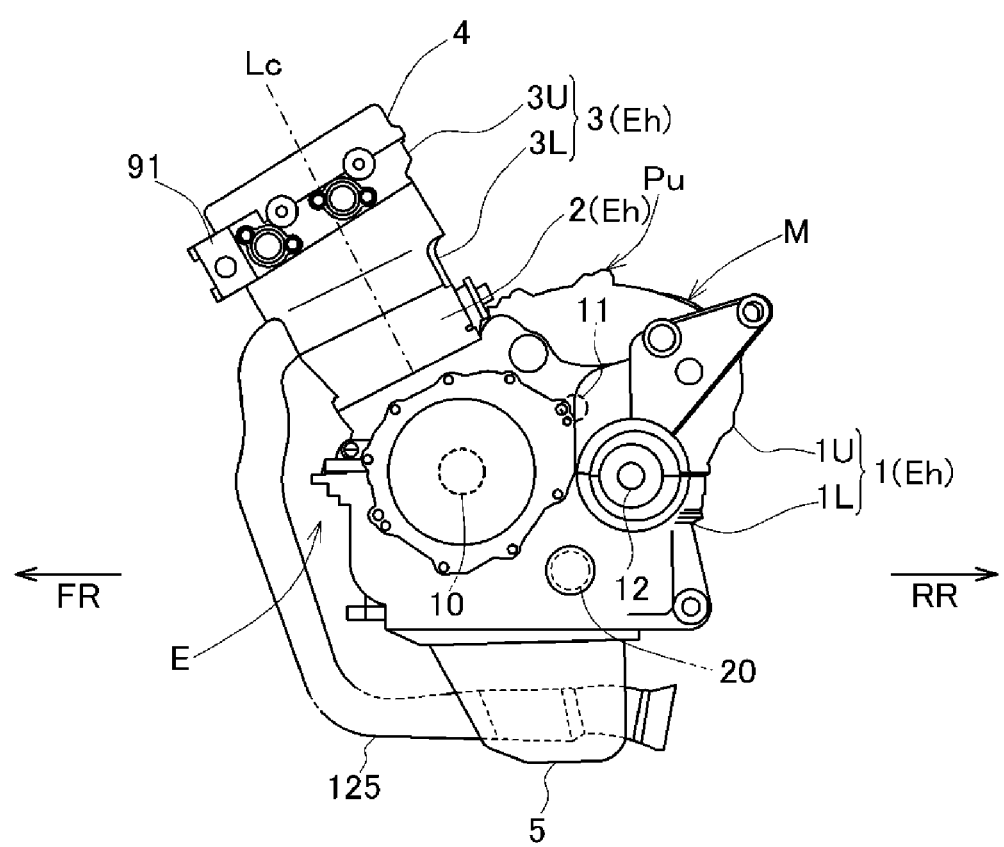
FIG. 2 is a left side elevational view of the power unit.

As illustrated in FIG. 2, the internal combustion engine E has an engine body Eh including, on the crankcase 1, a cylinder block 2 in which four cylinders separate from the crankcase 1 are arrayed in line, a cylinder head 3 coupled to an upper portion of the cylinder block 2 with a gasket interposed therebetween, and a cylinder head cover 4 covering an upper portion of the cylinder head 3.

The cylinders of the cylinder block 2 have a forwardly inclined common cylinder axis Lc as viewed along the array thereof. The cylinder block 2, the cylinder head 3, and the cylinder head cover 4 that are stacked on the crankcase 1 extend upward from the crankcase 1 in a slightly forwardly inclined posture.

An oil pan 5 that projects downwardly is mounted on a lower end of the crankcase 1.

The crankcase 1 is of a vertically split structure including an upper crankcase member 1U and a lower crankcase member 1L. The crankshaft 10 is disposed between and rotatably supported by mating surfaces of the upper and lower crankcase members 1U and 1L.

The crankcase 1 houses therein the transmission M that is disposed behind the crankshaft 10. The transmission M includes a main shaft 11 and the countershaft 12 that are oriented parallel to the crankshaft 10 transversely across the vehicle body frame and rotatably supported by the crankcase 1 (see FIG. 2).

Figure 3:
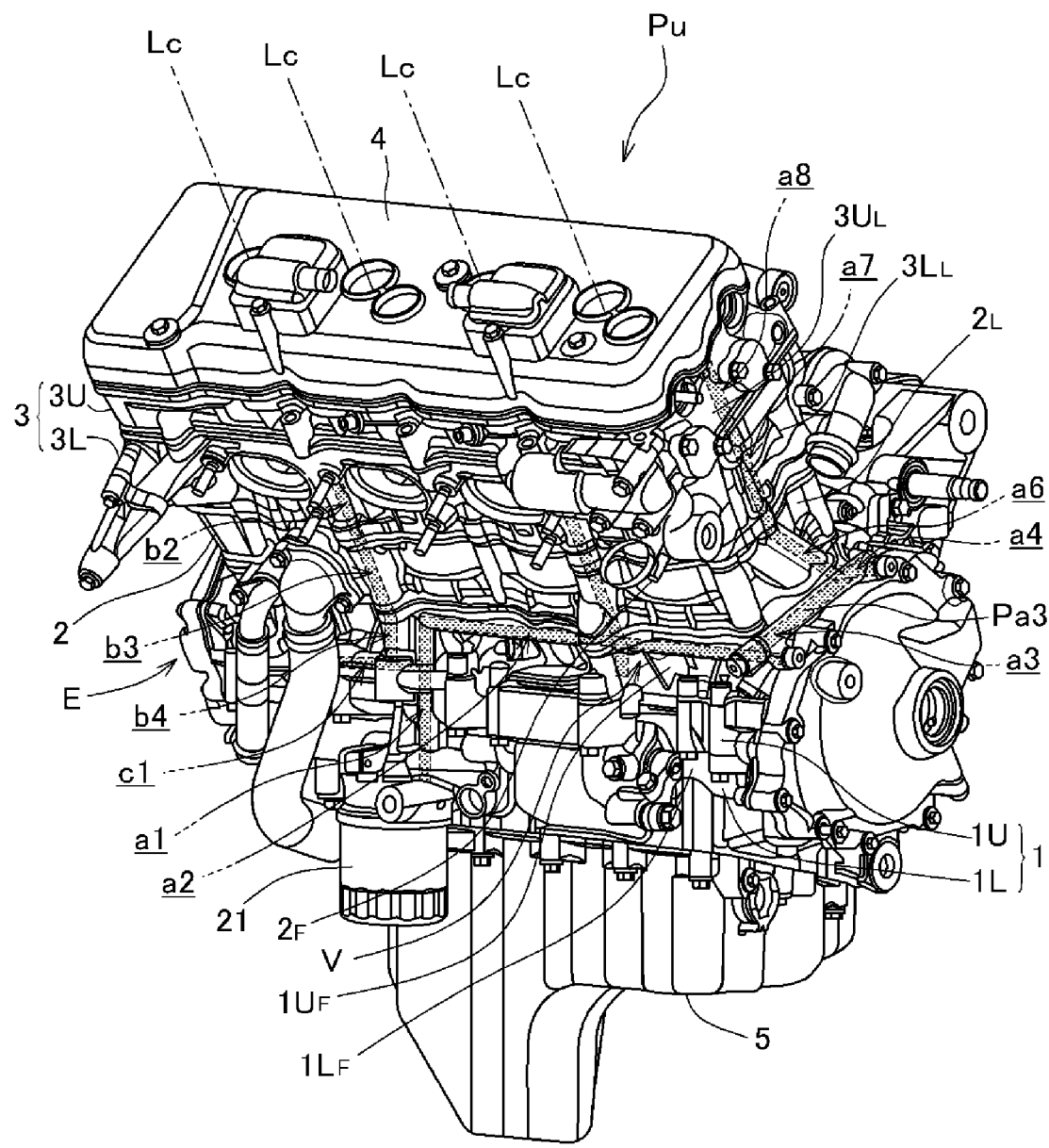
FIG. 3 is a perspective view of the power unit.

The main shaft 11 and the countershaft 12 of the transmission M are disposed in a transmission compartment in the crankcase 1 and oriented parallel to the crankshaft 10 leftward and rightward as will be noted from FIG. 3. The countershaft 12 extends leftward through the crankcase 1 and projects out of the crankcase 1, functioning as the output shaft of the power unit Pu.

Intake pipes that extend from the respective cylinders have ends connected to a rear side surface of the cylinder head 3. The intake pipes have other ends connected to the air cleaner 122 (see FIG. 1) through a throttle body 121.

Exhaust pipes 125 that extend from the respective cylinders have ends connected to a front side surface of the cylinder head 3. The exhaust pipes 125 extend downward, then are bent rearward, and extend rearward on the right side of the oil pan 5.

Figure 4:
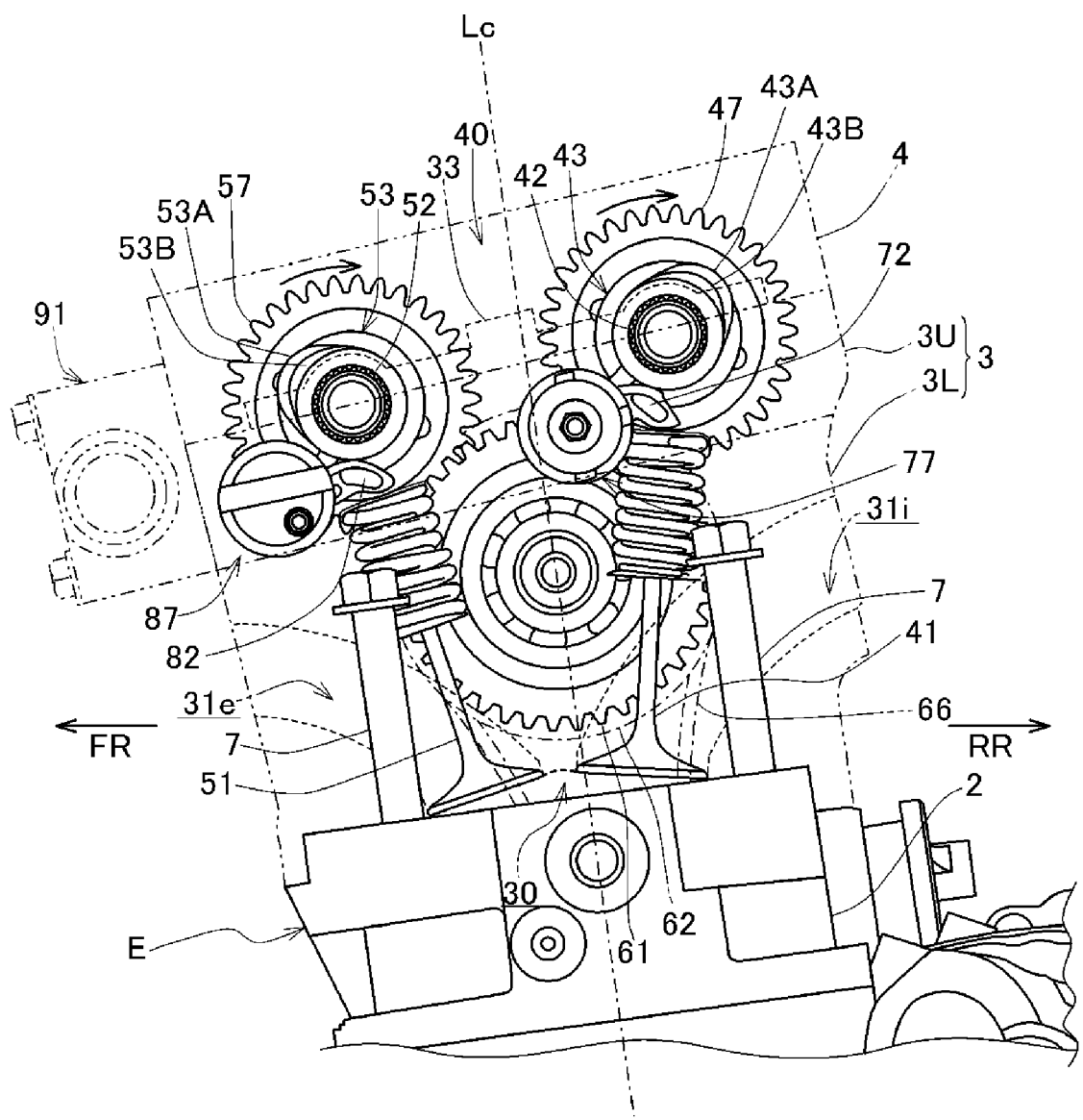
FIG. 4 is a left side elevational view of a valve operating mechanism disposed in a cylinder head of an internal combustion engine of the power unit, the cylinder head and other parts being illustrated as dotted-like profiles.

As shown in FIG. 4, the internal combustion engine E includes a four-valve double overhead camshaft (DOHC) variable valve operating mechanism 40 disposed in the cylinder head 3.

The cylinder head 3 of the engine E is of a structure that is vertically split along the cylinder axis Lc, made up of a lower cylinder head member 3L disposed on the cylinder block 2 and an upper cylinder head member 3U disposed on the lower cylinder head member 3L (see also FIG. 2).

As illustrated in FIG. 4, the lower cylinder head member 3L includes two intake ports 31$i$ bent rearward and extending obliquely upward from a combustion chamber 30 in each of the cylinders and two exhaust ports 31$e$ bent forward and extending obliquely upward from the combustion chamber 30 in each of the cylinders.

Two intake valves 41 and two exhaust valves 51 are supported in the lower cylinder head member 3L. The intake valves 41 and the exhaust valves 51 are reciprocally movable in synchronism with rotation of the crankshaft 10 to open and close intake valve holes through which the intake ports 31$i$ are open into the combustion chamber and exhaust valve holes through which the exhaust ports 31$e$ are open into the combustion chamber.

Figure 5:
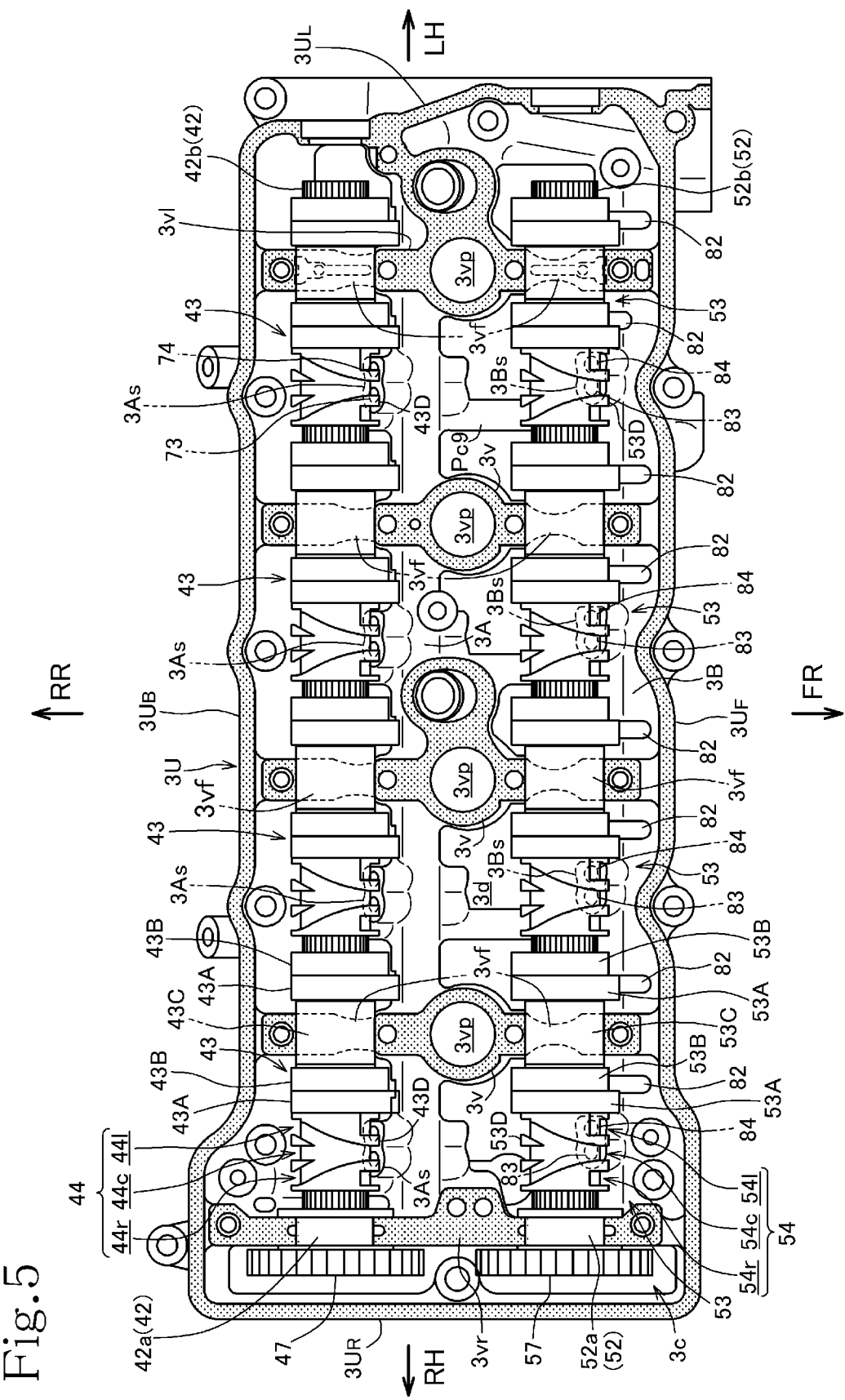
FIG. 5 is a plan view of an upper cylinder head member with a cylinder head cover and a camshaft holder being detached therefrom.

The lower cylinder head member 3L as well as the cylinder block 2 are integrally fastened to the upper crankcase member 1U by stud bolts 7 (see FIGS. 4 and 5).

As illustrated in FIG. 5, the upper cylinder head member 3U that is disposed on the lower cylinder head member 3L has a rectangular frame made up of a front side wall $3U_F$ and a rear side wall $3U_B$ that are longer in the leftward and rightward directions and a left side wall $3U_L$ and a right side wall $3U_R$ that are shorter in the forward and rearward directions, i.e., the longitudinal directions of the vehicle body frame.

The space inside the rectangular frame of the upper cylinder head member 3U is divided into a narrow right cam chain chamber 3$c$ and a wide left valve operating chamber 3$d$, by a bearing wall 3$vr$ parallel to the right side wall $3U_R$. The valve operating chamber 3$d$ is divided into five chambers by four bearing walls 3$v$ parallel to the left and right side walls $3U_L$ and $3U_R$.

The bearing walls 3$v$ are positioned above the center of the respective combustion chambers 30 of the cylinders, and have respective plug insertion tubes 3$vp$ positioned centrally in their longitudinal directions for insertion of spark ignition plugs thereinto.

The variable valve operating mechanism 40 is disposed in the valve operating chamber 3$d$ that is also defined by the cylinder head 3 and the cylinder head cover 4.

As illustrated in FIGS. 4 and 5, the intake valves 41, which are disposed as a pair of left and right intake valves 41 in combination with each of the four in-line cylinders, are arrayed in four pairs straight along the leftward and rightward directions. The intake valves 41 in four pairs underlie a single intake camshaft 42 extending in the leftward and rightward directions. The intake camshaft 42 is fitted in rear semi-arcuate bearing surfaces 3$vf$ of the bearing walls 3$v$, 3$vr$, and 3$vl$ of the upper cylinder head member 3U and sandwiched between and rotatably supported by the upper cylinder head member 3U and a camshaft holder 33.

Similarly, the exhaust valves 51, which are disposed as a pair of left and right exhaust valves 51 in combination with each of the four in-line cylinders, are arrayed in four pairs straight along the leftward and rightward directions. The exhaust valves 51 in four pairs underlie a single exhaust camshaft 52 extending in the leftward and rightward directions. The exhaust camshaft 52 is fitted in front semi-arcuate bearing surfaces 3$vf$ of the bearing walls 3$v$ and 3$vr$ of the upper cylinder head member 3U and sandwiched between and rotatably supported by the upper cylinder head member 3U and the camshaft holder 33.

The exhaust camshaft 52 is disposed forward of the intake camshaft 42 and extends parallel thereto.

As illustrated in FIG. 5, the intake camshaft 42 includes a journal or bearing-supported part 42$a$ that is supported by the bearing wall 3$vr$ near the right end thereof. The intake camshaft 42 is axially positioned by flanges disposed thereon on both sides of the bearing-supported part 42$a$ across the bearing wall 3$vr$. The intake camshaft 42 also includes an elongate splined shank 42$b$ extending to the left from the bearing-supported part 42$a$ and having spline teeth on an outer circumferential surface thereof. The splined shank 42$b$ extends through the four bearing walls 3$v$ in the valve operating chamber 3$d$.

An intake driven gear 47 is fitted over the flange on the right end of the intake camshaft 42 that projects into the cam chain chamber 3$c$.

Similarly, the exhaust camshaft 52 includes a journal or bearing-supported part 52$a$ that is supported by the bearing wall 3$vr$ near the right end thereof. The exhaust camshaft 52 is axially positioned by flanges disposed thereon on both sides of the bearing-supported part 52$a$ across the bearing wall 3$vr$. The exhaust camshaft 52 also includes an elongate splined shank 52$b$ extending to the left from the bearing-supported part 52$a$ and having spline teeth on an outer circumferential surface thereof. The splined shank 52$b$ extends through the four bearing walls 3$v$ in the valve operating chamber 3$d$.

An exhaust driven gear 57 is fitted over the flange on the right end of the exhaust camshaft 52 that projects into the cam chain chamber 3$c$.

Four intake cam carriers 43 in the form of tubular members are splined in an array on the splined shank 42b of the intake camshaft 42.

The four intake cam carriers 43 are axially slidably, but relatively non-rotatably, on the intake camshaft 42.

Similarly, four exhaust cam carriers 53 in the form of tubular members are splined in an array on the splined shank 52b of the exhaust camshaft 52. The four exhaust cam carriers 53 are axially slidably, but relatively non-rotatably, on the exhaust camshaft 52.

Figure 6:
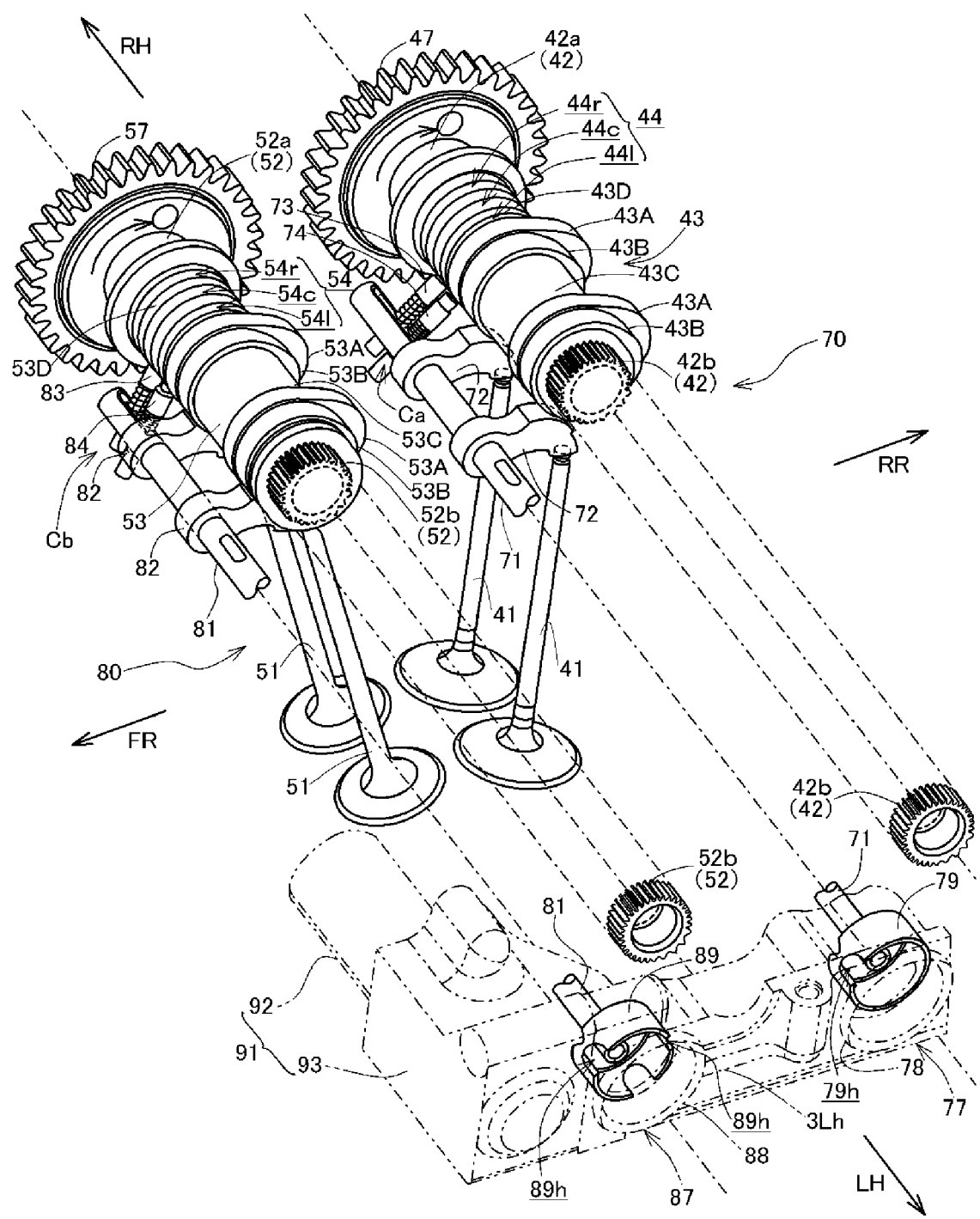
FIG. 6 is a perspective view of major components, partly omitted from illustration, of an intake cam switching mechanism and an exhaust cam switching mechanism.

FIG. 6 is a perspective view of major components, partly omitted from illustration, of an intake cam switching mechanism and an exhaust cam switching mechanism.

As illustrated in FIGS. 5 and 6, each of the intake cam carriers 43 includes a pair of left and right cam lobe sets each having a right high-speed cam lobe 43A and a left low-speed cam lobe 43B that have different cam profiles and that are axially adjacent to each other. The high-speed cam lobe 43A has a larger lift and the low-speed cam lobe 43B has a smaller lift. The left and right cam lobe sets are disposed one on each side of a bearing-supported tubular portion 43C having a predetermined axial width.

The high-speed cam lobe 43A and the low-speed cam lobe 43B have respective base circles whose outside diameters are equal to each other. The high-speed cam lobe 43A and the low-speed cam lobe 43B have respective noses oriented in identical angular or circumferential positions (see FIGS. 4 and 5).

Each of the intake cam carriers 43 has a lead-groove tubular portion 43D having a lead groove set 44 defined circumferentially therearound. The lead-groove tubular portion 43D is positioned axially on the right side of the right high-speed cam lobe 43A of the right cam lobe set.

The lead-groove tubular portion 43D has an outside diameter slightly smaller than the same outside diameters of the base circles of the high-speed cam lobe 43A and the low-speed cam lobe 43B.

As illustrated in FIG. 5, the lead groove set 44 of the lead-groove tubular portion 43D includes an annular lead groove 44c defined annularly circumferentially around the lead-groove tubular portion 43D, and a right shift lead groove 44r and a left shift lead groove 44l that are helically branched rightward and leftward from the annular lead groove 44c to respective positions that are axially spaced predetermined distances rightward and leftward from the annular lead groove 44c.

The four intake cam carriers 43 are splined in an array on the splined shank 42b of the intake camshaft 42 at predetermined axially spaced intervals.

The intake camshaft 42 with the four intake cam carriers 43 arrayed thereon is rotatably supported on the rear bearing surfaces 3vf of the bearing wall 3vr and the four bearing walls 3v of the upper cylinder head member 3U, as illustrated in FIG. 5.

The bearing-supported part 42a of the intake camshaft 42 is supported by the bearing wall 3vr, whereas the bearing-supported tubular portions 43C of the respective intake cam carriers 43 are supported by the respective bearing walls 3v.

As in the case of the intake cam carriers 43, each of the exhaust cam carriers 53 that are splined on the splined shank 52b of the exhaust camshaft 52 includes a pair of left and right cam lobe sets each having a right high-speed cam lobe 53A and a left low-speed cam lobe 53B that have different cam profiles and that are axially adjacent to each other. The left and right cam lobe sets are disposed one on each side of a bearing-supported tubular portion 53C having a predetermined axial width. Each of the exhaust cam carriers 53 has a lead-groove tubular portion 53D having a lead groove set 54 defined circumferentially therearound. The lead-groove tubular portion 53D is positioned axially on the right side of the right high-speed cam lobe 53A of the right cam lobe set.

The lead groove set 54 of the lead-groove tubular portion 53D includes an annular lead groove 54c defined annularly circumferentially around the lead-groove tubular portion 53D, and a right shift lead groove 54r and a left shift lead groove 54l that are helically branched rightward and leftward from the annular lead groove 54c to respective positions that are axially spaced predetermined distances rightward and leftward from the annular lead groove 54c (see FIG. 5).

The exhaust camshaft 52 with the four exhaust cam carriers 53 splined in an array on the splined shank 52b is rotatably supported on the front bearing surfaces 3vf of the bearing wall 3vr and the four bearing walls 3v of the upper cylinder head member 3U, as illustrated in FIG. 5.

The bearing-supported part 52a of the exhaust camshaft 52 is supported by the bearing wall 3vr, while the bearing-supported tubular portions 53C of the respective exhaust cam carriers 53 are supported by the respective bearing walls 3v.

The intake camshaft 42 as well as the intake cam carriers 43 and the exhaust camshaft 52 as well as the exhaust cam carriers 53, which are supported by the bearing wall 3vr and the four bearing walls 3v of the upper cylinder head member 3U, are sandwiched between and rotatably supported by the bearing wall 3vr and the four bearing walls 3v and the camshaft holder 33 (see FIG. 4) that is placed on the bearing wall 3vr and the four bearing walls 3v.

The four intake cam carriers 43 that are rotatable in unison with the intake camshaft 42 are axially slidably supported on the intake camshaft 42. The four exhaust cam carriers 53 that are rotatable in unison with the exhaust camshaft 52 are axially slidably supported on the exhaust camshaft 52.

The intake driven gear 47 mounted on the right end of the intake camshaft 42 and the exhaust driven gear 57 mounted on the right end of the exhaust camshaft 52 are of the same diameter and are juxtaposed in rear and front positions in the cam chain chamber 3c. As illustrated in FIG. 4, an enlarged-diameter idle gear 61 that is held in mesh with the intake driven gear 47 and the exhaust driven gear 57 is rotatably supported in the cam chain chamber 3c below a position between the intake driven gear 47 and the exhaust driven gear 57.

As illustrated in FIGS. 4 and 5, an idle chain sprocket 62 is coaxially mounted on the idle gear 61 for rotation therewith. A cam chain 66 disposed in the cam chain chamber 3c is trained around the idle chain sprocket 62 and also around a reduced-diameter drive chain sprocket, not depicted, that is fitted over the crankshaft 10 disposed below the variable valve operating mechanism 40.

When the internal combustion engine E is in operation, the rotation of the crankshaft 10 is transmitted through the cam chain 66 to the idle chain sprocket 62, rotating the idle gear 61 integral with the idle chain sprocket 62 to rotate the intake driven gear 47 and the exhaust driven gear 57 that are held in mesh with the idle gear 61. The intake driven gear 47 rotates the intake camshaft 42 about its own axis in union therewith, while the exhaust driven gear 57 rotates the exhaust camshaft 52 about its own axis in union therewith.

As illustrated in FIG. 6, the intake cam switching mechanism, denoted by 70, includes an intake cam switching drive shaft 71 disposed parallel to the intake camshaft 42 and obliquely forward and downward of the intake camshaft 42. The exhaust cam switching mechanism, denoted by 80, includes an exhaust cam switching drive shaft 81 disposed parallel to the exhaust camshaft 52 and obliquely forward and downward of the exhaust camshaft 52.

The intake cam switching drive shaft 71 and the exhaust cam switching drive shaft 81 are supported by the upper cylinder head member 3U.

Figure 12:
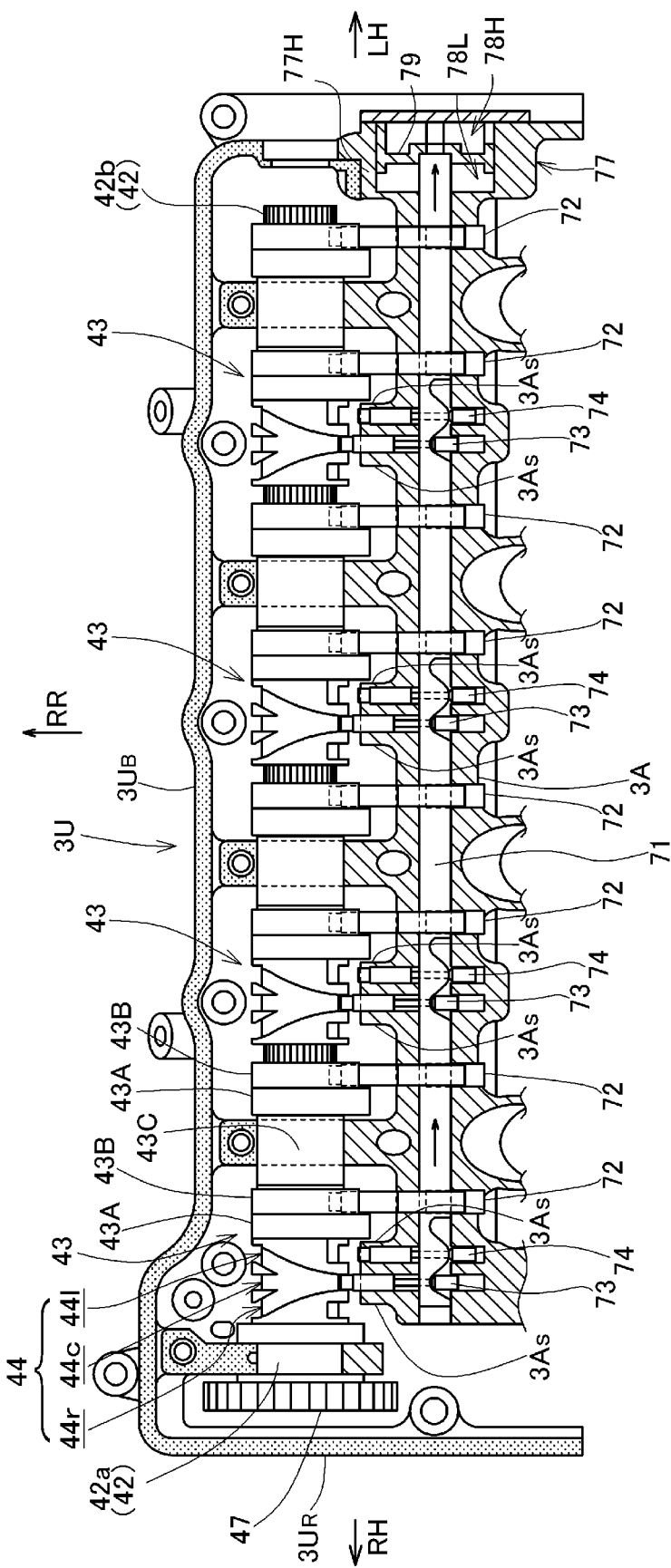
FIG. 12 is a front elevational view, partly in section, illustrative of the manner in which major components of the intake cam switching mechanism operate when the internal combustion engine operates in a low-speed range.

As illustrated in FIGS. 5, 6 and 12, the upper cylinder head member 3U has a tubular member 3A oriented in the leftward and rightward directions in the valve operating chamber 3d and extending straight from the bearing wall 3vr through the four bearing walls 3v at a position slightly rearward of the center, in the forward and rearward directions, of the upper cylinder head member 3U.

Similarly, as shown in FIG. 5, the upper cylinder head member 3U also has a tubular member 3B oriented in the leftward and rightward directions in the valve operating chamber 3d and extending straight from the bearing wall 3vr through the four bearing walls 3v at a position on an inner surface of the front side wall $3U_F$ of the upper cylinder head member 3U.

The intake cam switching drive shaft 71 is axially slidably inserted in an axial hole defined in the tubular member 3A, and the exhaust cam switching drive shaft 81 is axially slidably inserted in an axial hole defined in the tubular member 3B.

As will be noted from FIGS. 5 and 12, the tubular member 3A has two cutouts defined therein in alignment with the respective left and right intake valves 41 on both sides of the each of bearing walls 3v. The intake cam switching drive shaft 71 has portions exposed through the cutouts in the tubular member 3A, and two intake rocker arms 72 are swingably supported on the exposed portions of the intake cam switching drive shaft 71.

The intake cam switching drive shaft 71 thus doubles as a rocker arm shaft.

As illustrated in FIGS. 4 and 6, the intake rocker arms 72 have distal ends abutting against the respective upper ends of the intake valves 41. The intake rocker arms 72 also have respective curved upper end faces held in sliding contact with either the high-speed cam lobes 43A or the low-speed cam lobes 43B shifted by axial movement of the intake cam carrier 43.

When the intake cam carrier 43 rotates, either the high-speed cam lobes 43A or the low-speed cam lobes 43B swing the intake rocker arms 72 according to their cam profile, pressing the intake valves 41 to open the intake valve holes over the combustion chamber 30.

Likewise, the tubular member 3B has two cutouts defined therein in alignment with the respective left and right exhaust valves 51 on both sides of each of the bearing walls 3v. The exhaust cam switching drive shaft 81 has portions exposed through the cutouts in the tubular member 3B, and two exhaust rocker arms 82 are swingably supported on the exposed portions of the exhaust cam switching drive shaft 81 (see FIGS. 5 and 6).

The exhaust cam switching drive shaft 81 thus doubles as a rocker arm shaft.

As illustrated in FIGS. 4 and 6, the exhaust rocker arms 82 have distal ends abutting against the respective upper ends of the exhaust valves 51. The exhaust rocker arms 82 also have respective curved upper end faces held in sliding contact with either the high-speed cam lobes 53A or the low-speed cam lobes 53B shifted by axial movement of the exhaust cam carrier 53.

When the exhaust cam carrier 53 rotates, either the high-speed cam lobes 53A or the low-speed cam lobes 53B swing the exhaust rocker arms 82 according to their cam profile, pressing the exhaust valves 51 to open the exhaust valve holes over the combustion chamber 30.

As illustrated in FIG. 12, the tubular member 3A includes, in a region corresponding to each of the lead-groove tubular portions 43D of the intake cam carriers 43, two left and right tubular bosses 3As that are adjacent to each other. The tubular bosses 3As project toward the lead-groove tubular portion 43D (see FIG. 6).

The tubular bosses 3As have respective inner holes defined therein that extend diametrically across the tubular member 3A.

A first switching pin 73 and a second switching pin 74 are slidably inserted respectively in the inner holes in the tubular bosses 3As.

Figure 7:
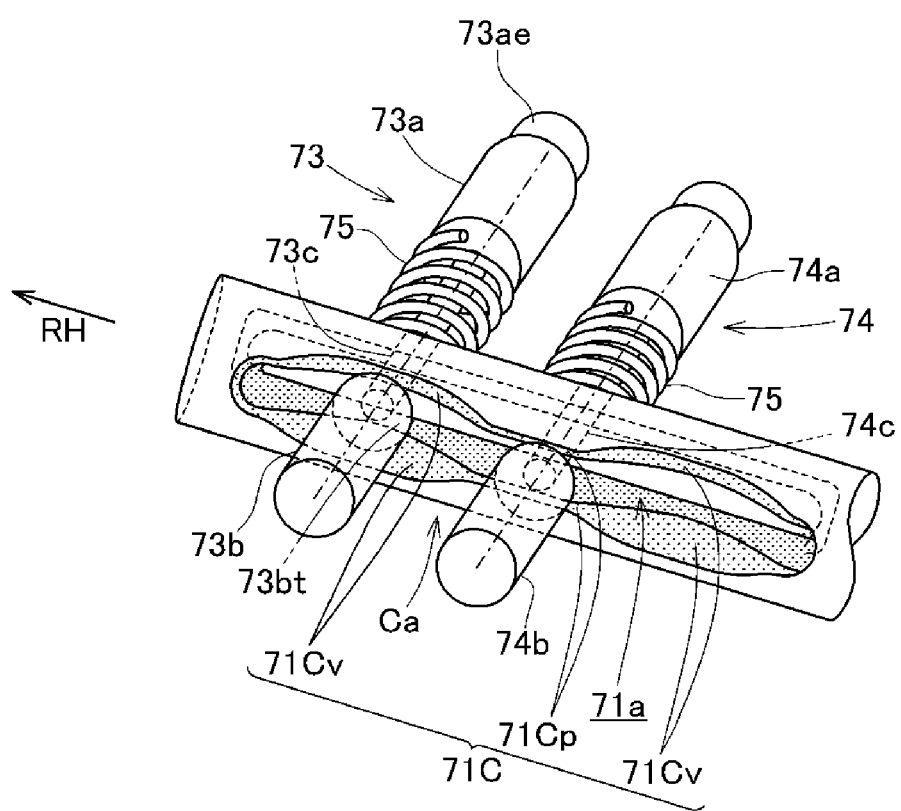
FIG. 7 is a perspective view of a first switching pin and a second switching pin that are mounted on an intake cam switching drive shaft.

As illustrated in FIG. 7, the first switching pin 73 includes a distal-end cylinder 73a, a proximal-end cylinder 73b, and an intermediate joint rod 73c interconnecting the distal-end cylinder 73a and the proximal-end cylinder 73b in line with each other.

The proximal-end cylinder 73b is smaller in outside diameter than the distal-end cylinder 73a.

An engaging end 73ae having a reduced diameter projects from the distal-end cylinder 73a in a direction away from the proximal-end cylinder 73b.

The proximal-end cylinder 73b has a conical end face 73bt on its end joined to the intermediate joint rod 73c.

The second switching pin 74 is of a shape identical to the first switching pin 73. Specifically, the second switching pin 74 includes a distal-end cylinder 74a, a proximal-end cylinder 74b, and an intermediate joint rod 74c interconnecting the distal-end cylinder 74a and the proximal-end cylinder 74b in line with each other.

As illustrated in FIG. 7, the intake cam switching drive shaft 71 has an axially oblong hole 71a defined therein across the axial center thereof.

The axially oblong hole 71a has a width slightly larger than the diameter of the intermediate joint rod 73c of the first switching pin 73, but smaller than the diameter of the proximal-end cylinder 73b.

The intake cam switching drive shaft 71 also has a cam surface 71C on an open end face of the axially oblong hole 71a. The cam surface 31C includes a pair of left and right concavely curved faces 71Cv of a predetermined concave shape that are joined to each other by a flat face 71Cp disposed therebetween.

As shown in FIG. 6, the first switching pin 73 is assembled on the intake cam switching drive shaft 71 such that the intermediate joint rod 73c extends through the axially oblong hole 71a in the intake cam switching drive shaft 71 and is normally biased by a helical spring 75 (FIG. 7) to press the conical end face 73bt of the proximal-end cylinder 73b against the cam surface 71C on the open end face of the axially oblong hole 71a. The first switching pin 73 that is slidably inserted in the inner hole in the tubular boss 3As is kept in a fixed position in the axial directions of the intake cam switching drive shaft 71 and is slidable in directions perpendicular to the axial directions of the intake cam switching drive shaft 71. When the intake cam switching drive shaft 71 is axially moved, the cam surface 71C axially slides in sliding abutment against the conical end face 73bt, guiding the first switching pin 73 to move selectively back and forth in the directions perpendicular to the axial directions of the intake cam switching drive shaft 71. The second switching pin 74 is similarly assembled on the intake cam switching drive shaft 71. The intake cam switching drive shaft 71, the first switching pin 73, and second switching pin 74 thus assembled together jointly make up a linear-motion cam mechanism Ca.

As illustrated in FIG. 7, the first switching pin 73 and the second switching pin 74 extend through the common axially oblong hole 71a in the intake cam switching drive shaft 71 and are arranged parallel to each other.

FIG. 7 illustrates the first and second switching pins 73 and 74 positioned with respect to the cam surface 71C of the intake cam switching drive shaft 71 such that the right concavely curved face 71Cv of the cam surface 71C has its central area positioned in alignment with the first switching pin 73, the first switching pin 73 is in an advanced position with the conical end face 73bt thereof abutting against the right concavely curved face 71Cv, and the second switching pin 74 is in a retracted position with the conical end face 73bt thereof abutting against the flat face 71Cp of the cam surface 71C.

When the intake cam switching drive shaft 71 is axially moved to the right from the position illustrated in FIG. 7, the conical end face 73bt of the first switching pin 73 slides from the central area of the right concavely curved face 71Cv up the slanted surface thereof to the flat face 71Cp, retracting the first switching pin 73, and the conical end face 73bt of the second switching pin 74 slides from the flat face 71Cp down the slanted surface of the left concavely curved face 71Cv to the central area thereof, advancing the second switching pin 74.

Accordingly, when the intake cam switching drive shaft 71 is axially moved, the cam surface 71C moves the first switching pin 73 and the second switching pin 74 alternately into the advanced and retracted positions.

Although not illustrated in detail, as in the case of the tubular member 3A, the tubular member 3B with the exhaust cam switching drive shaft 81 (see FIG. 6) axially slidably inserted therein also includes, in a region corresponding to each of the lead-groove tubular portions 53D of the exhaust cam carriers 53, two left and right tubular bosses 3Bs that are adjacent to each other, and a first switching pin 83 and a second switching pin 84 are slidably inserted respectively in the tubular bosses 3Bs. The first switching pin 83 and the second switching pin 84 extend parallel to each other through a common axially oblong hole 81a defined in the exhaust cam switching drive shaft 81 and are arranged parallel to each other (see FIGS. 5 and 6). The first switching pin 83 and the second switching pin 84 are identical in structure to the first switching pin 73 and the second switching pin 74.

The exhaust cam switching drive shaft 81 has a cam surface 81C on an open end face of the axially oblong hole 81a. The cam surface 81C is of the same cam profile as the cam surface 71C of the intake cam switching drive shaft 71. When the exhaust switching drive shaft 81 is axially moved, the cam surface 81C moves the first switching pin 83 and the second switching pin 84 alternately into the advanced and retracted positions perpendicularly to the axial directions of the exhaust switching drive shaft 81. The exhaust switching drive shaft 81, the first switching pin 83, and second switching pin 84 assembled together jointly make up a linear-motion cam mechanism Cb.

As illustrated in FIG. 5, the exhaust switching drive shaft 81 and the first and second switching pins 83 and 84 passed in the tubular bosses 3Bs are disposed such that at least portions thereof overlap axial extensions of the four stud bolts 7 on the front side, e.g., on the side of the exhaust valve 51, of all the stud bolts 7 by which the cylinder block 2 and the cylinder head 3 are fastened together to the crankcase 1.

As illustrated in FIGS. 5 and 6, an intake hydraulic actuator 77 for axially moving the intake cam switching drive shaft 71 is housed in the left side wall $3U_L$ of the upper cylinder head member 3U and projects into the valve operating chamber 3d. An exhaust hydraulic actuator 87 for axially moving the exhaust cam switching drive shaft 81 is also housed in the left side wall $3U_L$ of the upper cylinder head member 3U and projects into the valve operating chamber 3d. The exhaust hydraulic actuator 87 is positioned forward of the intake hydraulic actuator 77.

The exhaust hydraulic actuator 87 and the intake hydraulic actuator 77 are integrally combined with the upper cylinder head member 3U.

As illustrated in FIG. 5, the intake hydraulic actuator 77 and the exhaust hydraulic actuator 87 are disposed such that at least portions thereof overlap axial extensions of the leftmost two stud bolts 7 of all the stud bolts 7, i.e., the ten stud bolts 7, by which the cylinder block 2 and the cylinder head 3 are fastened together to the crankcase 1.

Figure 8:
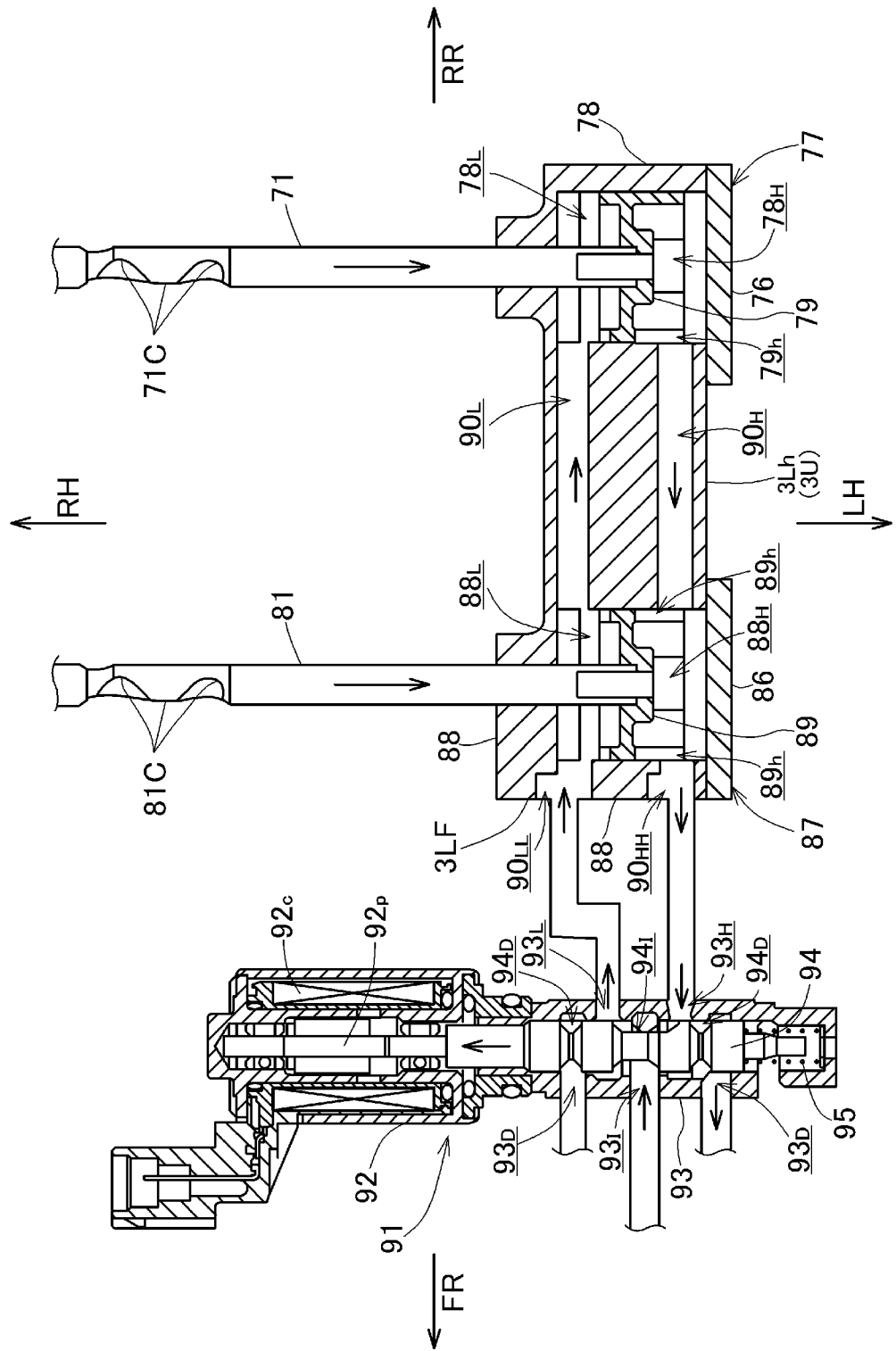
FIG. 8 is a diagram illustrating the position of parts in which oil under pressure is supplied to and discharged from an intake hydraulic actuator and an exhaust hydraulic actuator when a linear solenoid valve is de-energized.
Figure 9:
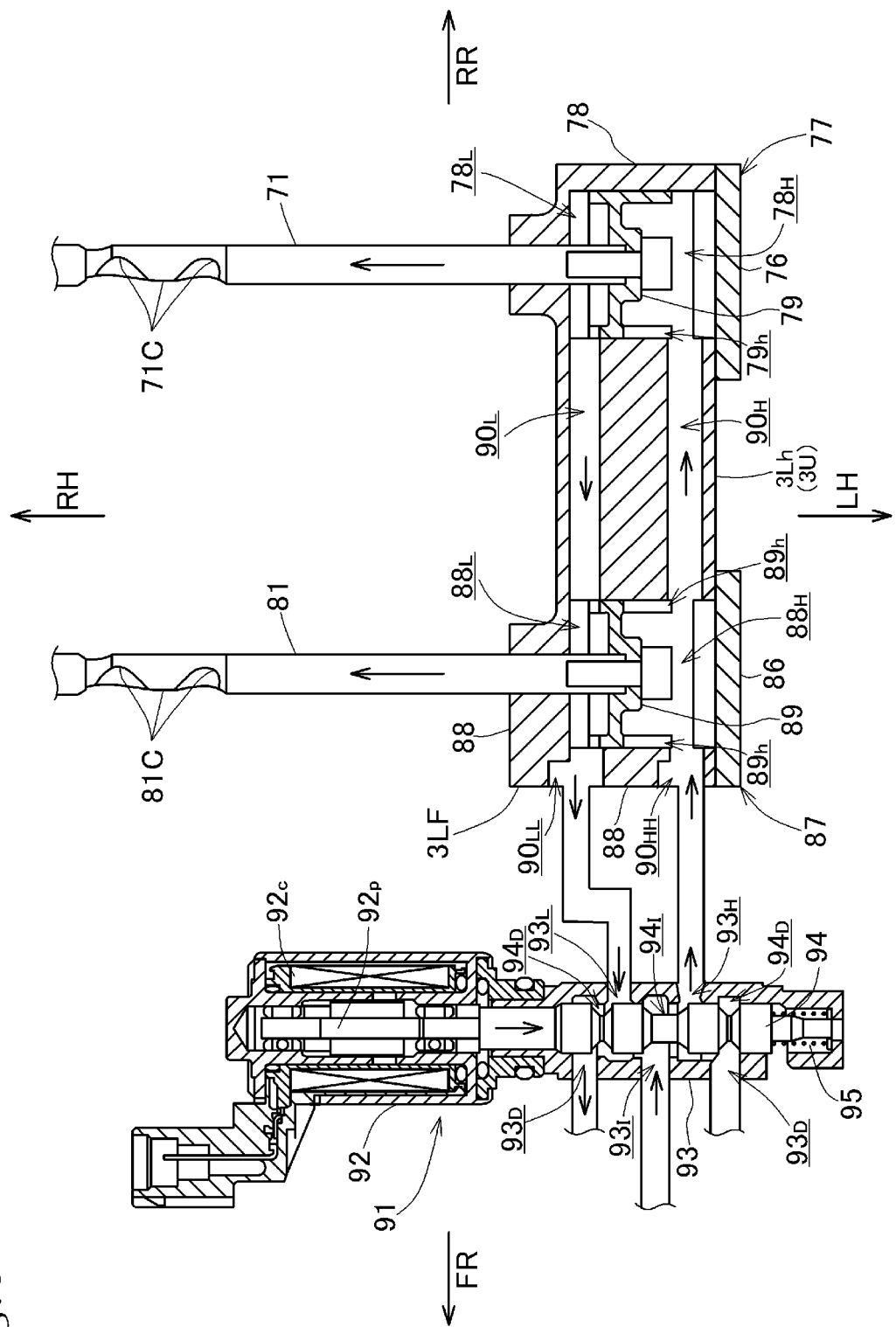
FIG. 9 is a diagram illustrating the position of parts in which oil under pressure is supplied to and discharged from the intake hydraulic actuator and the exhaust hydraulic actuator when the linear solenoid-operated valve is energized.

As illustrated in FIGS. 8 and 9, the intake hydraulic actuator 77 includes an intake actuator housing 78 having an inner housing chamber defined therein in the form of a circular hole and an intake actuator drive body 79 in the form of a bottomed hollow cylinder that is slidably fitted in the inner housing chamber for reciprocating sliding movement in the axial directions, i.e., the leftward and rightward directions, of the intake cam switching drive shaft 71. The intake cam switching drive shaft 71 has a left end securely fitted in the intake actuator drive body 79 for movement in unison therewith.

The inner housing chamber defined in the intake actuator housing 78 has a left opening closed by a lid 76 and is divided by the intake actuator drive body 79 into a left high-speed hydraulic chamber $78_H$ and a right low-speed hydraulic chamber $78_L$.

Similarly, the exhaust hydraulic actuator 87 includes an exhaust actuator housing 88 having an inner housing chamber defined therein in the form of a circular hole and an exhaust actuator drive body 89 in the form of a bottomed hollow cylinder that is slidably fitted in the inner housing chamber for reciprocating sliding movement in the axial directions, i.e., the leftward and rightward directions, of the exhaust cam switching drive shaft 81. The exhaust cam switching drive shaft 81 has a left end securely fitted in the exhaust actuator drive body 89 for movement in unison therewith.

The inner housing chamber defined in the exhaust actuator housing 88 has a left opening closed by a lid 86 and is divided by the exhaust actuator drive body 89 into a left high-speed hydraulic chamber $88_H$ and a right low-speed hydraulic chamber $88_L$.

As illustrated in FIGS. 8 and 9, the left side wall $3U_L$ (FIG. 5) of the upper cylinder head member 3U has, defined therein, a high-speed supply/discharge oil passageway $90_H$ that provides fluid communication between the high-speed hydraulic chamber $78_H$ of the intake hydraulic actuator 77 and the high-speed hydraulic chamber $88_H$ of the exhaust hydraulic actuator 87, and a low-speed supply/discharge oil passageway $90_L$ that provides fluid communication between the low-speed hydraulic chamber $78_L$ of the intake hydraulic actuator 77 and the low-speed hydraulic chamber $88_L$ of the exhaust hydraulic actuator 87.

The high-speed supply/discharge oil passageway $90_H$ extends forward through the high-speed hydraulic chamber $88_H$ of the exhaust hydraulic actuator 87 and is open at a left-end mating surface $3U_{FL}$ (see FIG. 10) of a left end portion of the front face of the front side wall $3U_F$ of the upper cylinder head member 3U. The low-speed supply/discharge oil passageway $90_L$ extends forward through the low-speed hydraulic chamber $88_L$ of the exhaust hydraulic actuator 87 and is open at the left-end mating surface $3U_{FL}$ (see FIG. 10) of the front side wall $3U_F$ of the upper cylinder head member 3U.

The intake actuator drive body 79 of the intake hydraulic actuator 77 has an axially elongate oblong hole 79h defined in a portion of the bottomed hollow cylinder thereof that faces the high-speed supply/discharge oil passageway $90_H$. Even when the intake actuator drive body 79 moves in the intake actuator housing 78, the port of the high-speed supply/discharge oil passageway $90_H$ that is defined in the intake actuator housing 78 and that is open into the inner housing chamber therein faces the oblong hole 79h at all times, keeping the high-speed supply/discharge oil passageway $90_H$ and the high-speed hydraulic chamber $78_H$ in fluid communication with each other at all times.

The exhaust actuator drive body 89 of the exhaust hydraulic actuator 87 has two axially elongate oblong holes 89h defined in diametrically opposite portions of the bottomed hollow cylinder thereof that face the high-speed supply/discharge oil passageway $90_H$. Even when the exhaust actuator drive body 89 moves in the exhaust actuator housing 88, the ports of the high-speed supply/discharge oil passageway $90_H$ that are defined in the exhaust actuator housing 88 and that are open into the inner housing chamber therein faces the oblong holes 89h at all times, keeping the high-speed supply/discharge oil passageway $90_H$ and the high-speed hydraulic chamber $78_H$ in fluid communication with each other at all times.

The low-speed supply/discharge oil passageway $90_L$ is kept in fluid communication with the low-speed hydraulic chamber $78_L$ of the intake hydraulic actuator 77 and the low-speed hydraulic chamber $88_L$ of the exhaust hydraulic actuator 87, irrespectively of whether the intake actuator drive body 79 of the intake hydraulic actuator 77 and the exhaust actuator drive body 89 of the exhaust hydraulic actuator 87 are moved in the leftward or rightward directions.

Figure 10:
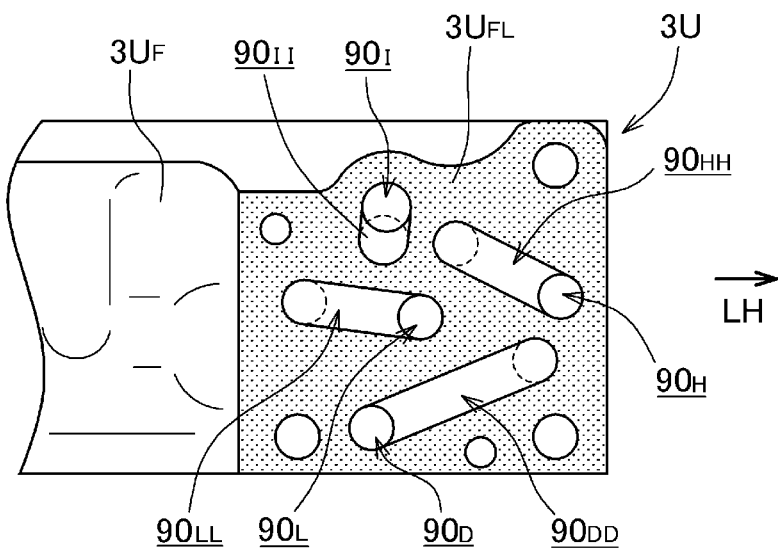
FIG. 10 is a front elevational view of a left-end mating surface of a front surface of a front side wall of the upper cylinder head member.

FIG. 10 illustrates the left-end mating surface $3U_{FL}$ of the front face of the front side wall $3U_F$ of the upper cylinder head member 3U. The high-speed supply/discharge oil passageway $90_H$ and the low-speed supply/discharge oil passageway $90_L$ are open at the left-end mating surface $3U_{FL}$, and oblong grooves $90_{HH}$ and $90_{LL}$ (see also FIG. 8) are defined in the left-end mating surface $3U_{FL}$ and extend obliquely slightly upward to the right from the openings of the high-speed supply/discharge oil passageway $90_H$ and the low-speed supply/discharge oil passageway $90_L$.

A linear solenoid-operated valve 91 is mounted on the left-end mating surface $3U_{FL}$ of the front face of the front side wall $3U_F$ of the upper cylinder head member 3U.

As illustrated in FIGS. 8 and 9, the linear solenoid-operated valve 91 includes an electromagnetic solenoid 92 having a plunger 92p axially movable in an electromagnetic coil 92c, and a sleeve 93 mounted on and axially extending from the electromagnetic solenoid 92.

A spool valve 94 is slidably fitted in the sleeve 93 and is normally biased by a spring 95 to abut against the plunger 92p.

The linear solenoid-operated valve 91 is installed on the left-end mating surface $3U_{FL}$ of the front face of the front side wall $3U_F$ of the upper cylinder head member 3U in such a posture that the spool valve 94 coaxial with the plunger 92p of the electromagnetic solenoid 92 is oriented horizontally in the leftward and rightward directions (see FIGS. 2 and 3).

As illustrated in FIGS. 8 and 9, the spool valve 94 of the linear solenoid-operated valve 91 is oriented in the leftward and rightward directions parallel to the intake cam switching drive shaft 71 and the exhaust cam switching drive shaft 81 and is axially movable in the leftward and rightward directions.

When the electromagnetic coil 92c is energized, the plunger 92p is axially moved together with the spool valve 94 in the sleeve 93 against the bias of the spring 95 and projects in the leftward direction (LH). When the electromagnetic coil 92c is de-energized, the plunger 92p is moved back under the bias of the spring 95 and retracted in the rightward direction (RH) (see FIG. 8).

The sleeve 93 has, defined therein, a central hydraulic pressure supply port $93_I$, a high-speed supply/discharge port $93_H$ and a low-speed supply/discharge port $93_L$ that are positioned respectively on both sides of the central hydraulic pressure supply port $93_I$, and a pair of left and right drain ports $93_D$ that are positioned respectively on both sides of the high-speed supply/discharge port $93_H$ and the low-speed supply/discharge port $93_L$.

The spool valve 94 that is axially slidable in the sleeve 93 has a central hydraulic pressure supply groove $94_I$ and a pair of left and right drain grooves $94_D$ that are positioned respectively on both sides of the central hydraulic pressure supply groove $94_I$ with respective lands interposed therebetween. These grooves are arrayed axially along the spool valve 94.

The sleeve 93 of the linear solenoid-operated valve 91 is schematically illustrated in FIGS. 8 and 9.

Figure 11:
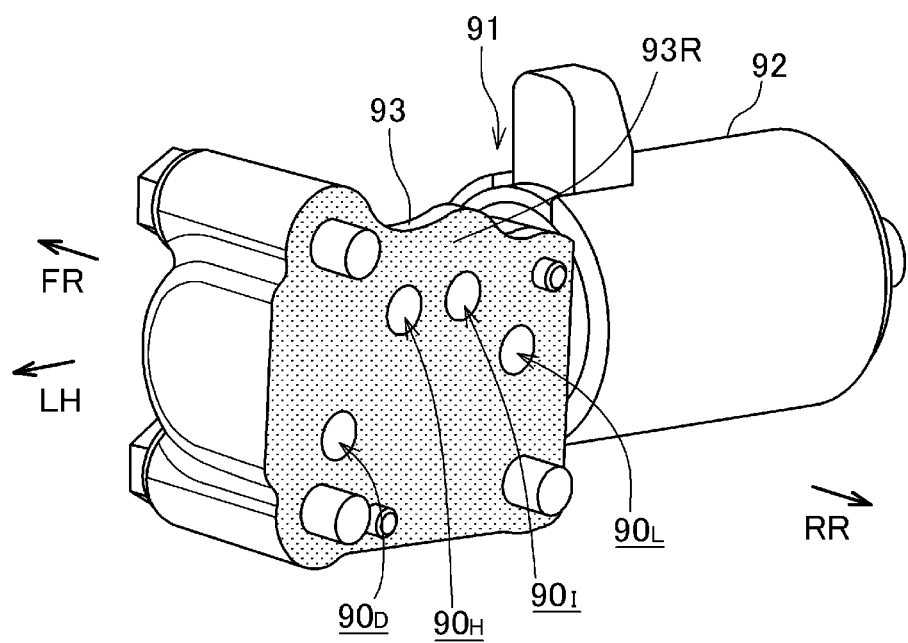
FIG. 11 is a perspective view of the linear solenoid-operated valve.

FIG. 11 illustrates the linear solenoid-operated valve 91 in an actual configuration. The sleeve 93 has a mating surface 93R on a rear side thereof. The central hydraulic pressure supply port $93_I$, the high-speed supply/discharge port $93_H$, the low-speed supply/discharge port $93_L$, and the drain ports $93_D$ have respective openings that are open at the mating surface 93R.

The mating surface 93R on the rear side of the sleeve 93 of the linear solenoid-operated valve 91 is mated to the left-end mating surface $3U_{FL}$ of the front side wall $3U_F$ of the upper cylinder head member 3U, whereupon the linear solenoid-operated valve 91 is mounted on the upper cylinder head member 3U.

As illustrated in FIG. 10, an oblong groove $90_{II}$ of a hydraulic pressure supply passageway $90_I$, the oblong groove $90_{HH}$ of the high-speed supply/discharge oil passageway $90_H$, the oblong groove $90_{LL}$ of the low-speed supply/discharge oil passageway $90_L$, and an oblong groove $90_{DD}$ of a drain oil passageway $90_D$ have openings defined in the left-end mating surface $3U_{FL}$ of the front side wall $3U_F$ of the upper cylinder head member 3U respectively in alignment with the hydraulic pressure supply port $93_I$, the high-speed supply/discharge port $93_H$, the low-speed supply/discharge port $93_L$, and the drain ports $93_D$ that are defined in the sleeve 93.

In the position of parts illustrated in FIG. 8, the electromagnetic solenoid 92 of the linear solenoid-operated valve 91 is de-energized and the spool valve 94 is retracted to the right (RH) under the bias of the spring 95. Therefore, oil under pressure supplied from the hydraulic pressure supply passageway $90_I$ through the oblong groove $90_{II}$ to the central hydraulic pressure supply port $93_I$ in the sleeve 93 flows through the central hydraulic pressure supply groove $94_I$, the low-speed supply/discharge port $93_L$, and the oblong groove $90_{LL}$ into the low-speed supply/discharge oil passageway $90_L$ in the left side wall $3U_L$ of the upper cylinder head member 3U. At this time, the oil is supplied to the right low-speed hydraulic chamber $88_L$ of the exhaust hydraulic actuator 87 and then to the right low-speed hydraulic chamber $78_L$ of the intake hydraulic actuator 77 via the right low-speed hydraulic chamber $88_L$, pressing and moving the intake actuator drive body 79 of the intake hydraulic actuator 77 and the exhaust actuator drive body 89 of the exhaust hydraulic actuator 87 to the left (LH) respectively in the intake actuator housing 78 and the exhaust actuator housing 88.

As the intake and exhaust actuator drive bodies 79 and 89 of the intake and exhaust hydraulic actuators 77 and 87 are moved to the left, oil under pressure flows out of the left high-speed hydraulic chamber $78_H$ of the intake and exhaust hydraulic actuators 77 into the high-speed supply/discharge oil passageway $90_H$ and out of the left high-speed hydraulic chamber $88_H$ of the intake and exhaust hydraulic actuators 87, from where the oil under pressure flows through the oblong groove $90_{HH}$ into the high-speed supply/discharge port $93_H$ in the sleeve 93. The oil under pressure is then drained through the left drain groove $94_D$ into the left drain port $93_D$, from which the oil under pressure is discharged through the oblong groove $90_{DD}$ into the drain oil passageway $90_D$.

As described above, when the electromagnetic solenoid 92 of the linear solenoid-operated valve 91 is de-energized, oil under pressure is supplied to the right low-speed hydraulic chambers $78_L$ and $88_L$ of the intake and exhaust hydraulic actuators 77 and 87, and oil under pressure flows out of the left high-speed hydraulic chambers $78_H$ and $88_H$ of the intake and exhaust hydraulic actuators 77 and 87. Since the intake and exhaust actuator drive bodies 79 and 89 of the intake and exhaust hydraulic actuators 77 and 87 are simultaneously moved to the left (LH), the intake cam switching drive shaft 71 and the exhaust cam switching drive shaft 81 that are integrally fitted in the respective intake and exhaust actuator drive bodies 79 and 89 are also simultaneously moved to the left (LH).

When the electromagnetic solenoid 92 of the linear solenoid-operated valve 91 is energized, as illustrated in FIG. 9, the spool valve 94 is axially shifted to the left (LH) against the bias of the spring 95. Oil under pressure supplied to the central hydraulic pressure supply port $93_I$ in the sleeve 93 flows through the central hydraulic pressure supply groove $94_I$, the high-speed supply/discharge port $93_H$, and the oblong groove $90_{HH}$ into the high-speed supply/discharge oil passageway $90_H$ in the left side wall $3U_L$ of the upper cylinder head member 3U. At this time, the oil under pressure is supplied to the left high-speed hydraulic chamber $88_H$ of the exhaust hydraulic actuator 87 and then to the left high-speed hydraulic chamber $78_H$ of the intake hydraulic actuator 77 via the left high-speed hydraulic chamber $88_H$, pressing and moving the intake actuator drive body 79 of the intake hydraulic actuator 77 and the exhaust actuator drive body 89 of the exhaust hydraulic actuator 87 to the right (RH) respectively in the intake actuator housing 78 and the exhaust actuator housing 88.

At the same time, oil under pressure flows out of the right low-speed hydraulic chamber $78_L$ into the low-speed supply/discharge oil passageway $90_L$ and out of the right low-speed hydraulic chamber $88_L$, from which the oil under pressure flows through the oblong groove $90_{LL}$ into the low-speed supply/discharge port $93_L$ of the electromagnetic solenoid 92 of the linear solenoid-operated valve 91 in the sleeve 93. The oil under pressure is then drained through the right drain groove $94_D$ into the right drain port $93_D$, from which the oil under pressure is discharged through the oblong groove $90_{DD}$ into the drain oil passageway $90_D$.

As described above, when the electromagnetic solenoid 92 of the linear solenoid-operated valve 91 is energized, oil under pressure is supplied to the left high-speed hydraulic chambers $78_H$ and $88_H$ of the intake and exhaust hydraulic actuators 77 and 87, and oil under pressure flows out of the right low-speed hydraulic chambers $78_L$ and $88_L$ of the intake and exhaust hydraulic actuators 77 and 87. Since the intake and exhaust actuator drive bodies 79 and 89 of the intake and exhaust hydraulic actuators 77 and 87 are simultaneously moved to the right (RH), the intake cam switching drive shaft 71 and the exhaust cam switching drive shaft 81 that are integrally fitted in the respective intake and exhaust actuator drive bodies 79 and 89 are also simultaneously moved to the right (RH).

When the electromagnetic solenoid 92 of the linear solenoid-operated valve 91 is de-energized, moving the intake cam switching drive shaft 71 and the exhaust cam switching drive shaft 81 to the left (LH), as described above, the first switching pins 73 of the respective linear-motion cam mechanisms Ca in the intake cam switching mechanism 70 illustrated in FIG. 12 abut against the respective right concavely curved faces 71Cv of the intake cam switching drive shaft 71 and are in their advanced positions, and the second switching pins 74 thereof abut against the respective flat faces 71Cp and are in their retracted positions.

The advanced first switching pins 73 engage in the respective annular lead grooves 44c in the lead-groove tubular portions 43D of the intake cam carriers 43 that have moved to the right. The intake cam carriers 43 are not axially moved, but remain in their right predetermined positions.

When the intake cam carriers 43 are in their right predetermined positions, i.e., low-speed positions, as illustrated in FIG. 12, the left low-speed cam lobes 43B act on the intake rocker arms 72, operating the intake valves 41 according to low-speed valve operating characteristics based on the cam profile of the left low-speed cam lobes 43B.

In other words, the internal combustion engine E operates in a low-speed mode.

Figure 13:
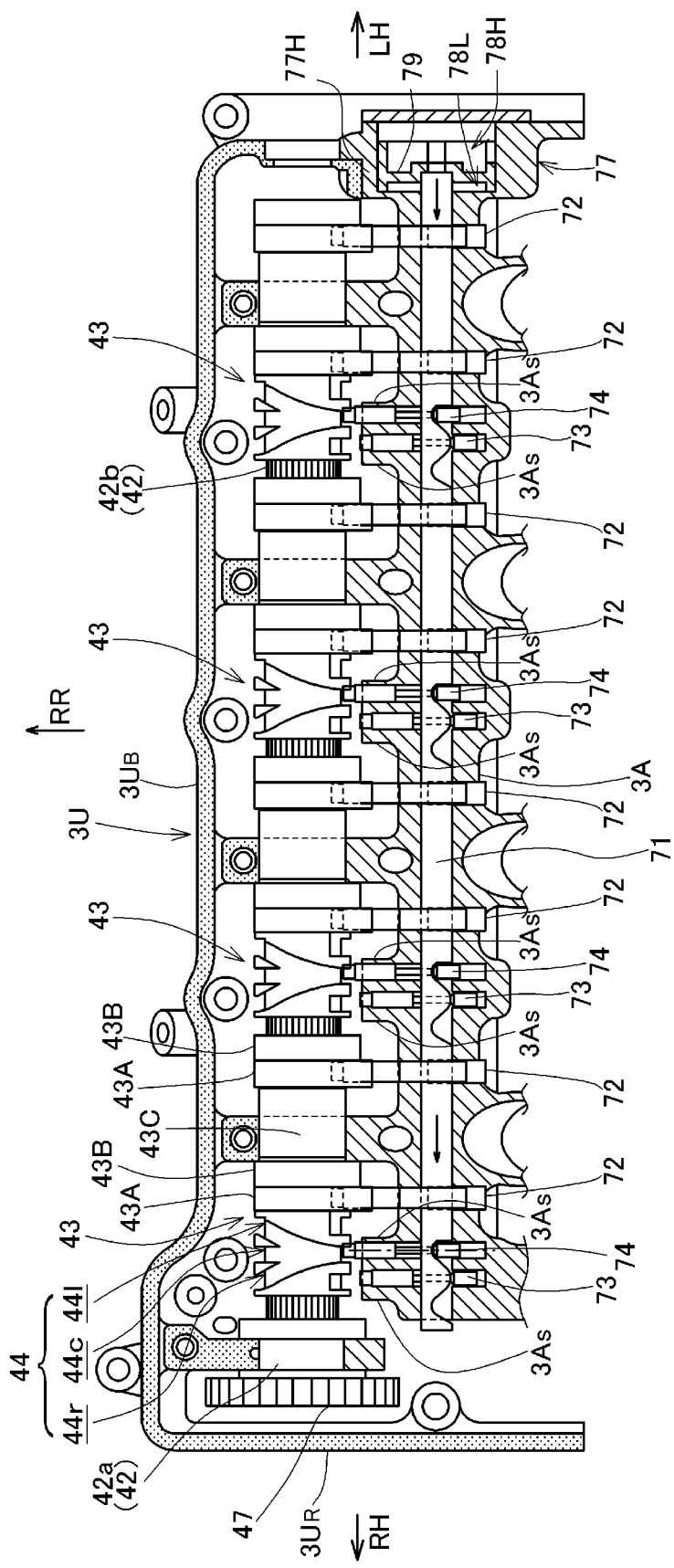
FIG. 13 is a front elevational view, partly in section, illustrative of the manner in which major components of the intake cam switching mechanism operate when the internal combustion engine operates in a high-speed range.

When the electromagnetic solenoid 92 of the linear solenoid-operated valve 91 is then energized, moving the intake cam switching drive shaft 71 to the right (RH), as illustrated in FIG. 13, the conical end faces 73bt of the first switching pins 73 slide from the central area of the right concavely curved faces 71Cv up the slanted surfaces thereof to the flat faces 71Cp, retracting the first switching pins 73, and the conical end faces 74bt of the second switching pins 74 slide from the flat faces 71Cp down the slanted surfaces of the left concavely curved faces 71Cv to the central area thereof, advancing the second switching pins 74.

Consequently, the retracted first switching pins 73 are pulled out of the respective annular lead grooves 44c of the intake cam carriers 43, and the advanced second switching pins 74 engage in the left shift lead grooves 44l. The intake cam carriers 43 are axially moved to the left while rotating and being guided by the left shift lead grooves 44l. As illustrated in FIG. 13, the second switching pins 74 are moved from the left shift lead grooves 44l to the respective annular lead grooves 44c and engage in the respective annular lead grooves 44c. The intake cam carriers 43 now remain in their left predetermined positions.

When the intake cam carriers 43 are in their left predetermined positions, i.e., high-speed positions, as illustrated in FIG. 13, the right high-speed cam lobes 43A act on the intake rocker arms 72, operating the intake valves 41 according to high-speed valve operating characteristics based on the cam profile of the right low-speed cam lobes 43A.

In other words, the internal combustion engine E operates in a high-speed mode.

When the intake cam switching drive shaft 71 is moved to the left from the high-speed mode of operation, the retracted second switching pins 74 are pulled out of the respective annular lead grooves 44c, and the first switching pins 73 are advanced and engage in the right shift lead grooves 44r. The intake cam carriers 43 are axially moved to the right while rotating and being guided by the right shift lead grooves 44r. As illustrated in FIG. 12, the intake cam carriers 43 now remain in their left predetermined positions, i.e., the low-speed positions, operating the internal combustion engine E in the low-speed mode in which the low-speed cam lobes 43B act on the respective intake rocker arms 72.

While the intake cam switching mechanism 70 is being actuated by the intake cam switching drive shaft 71 as it is moved when the electromagnetic solenoid 92 of the linear solenoid-operated valve 91 is energized and de-energized, the exhaust cam switching mechanism 80 is similarly actuated by the exhaust cam switching drive shaft 81 as it is moved when the electromagnetic solenoid 92 of the linear solenoid-operated valve 91 is energized and de-energized.

Oil passageways for supplying oil to the valve operating mechanism will be described below with reference to FIGS. 2, 3, and 14 through 31.

As illustrated in FIG. 2, an oil pump 20 is disposed on a rear portion of the lower crankcase member 1L closely to the oil pan 5.

As illustrated in FIGS. 2 and 3, the cylinder block 2, the cylinder head 3, and the cylinder head cover 4 that are stacked on the upper crankcase member 1U extend upward along the cylinder axis Lc in a posture slightly inclined forward from the crankcase 1.

Figure 24:
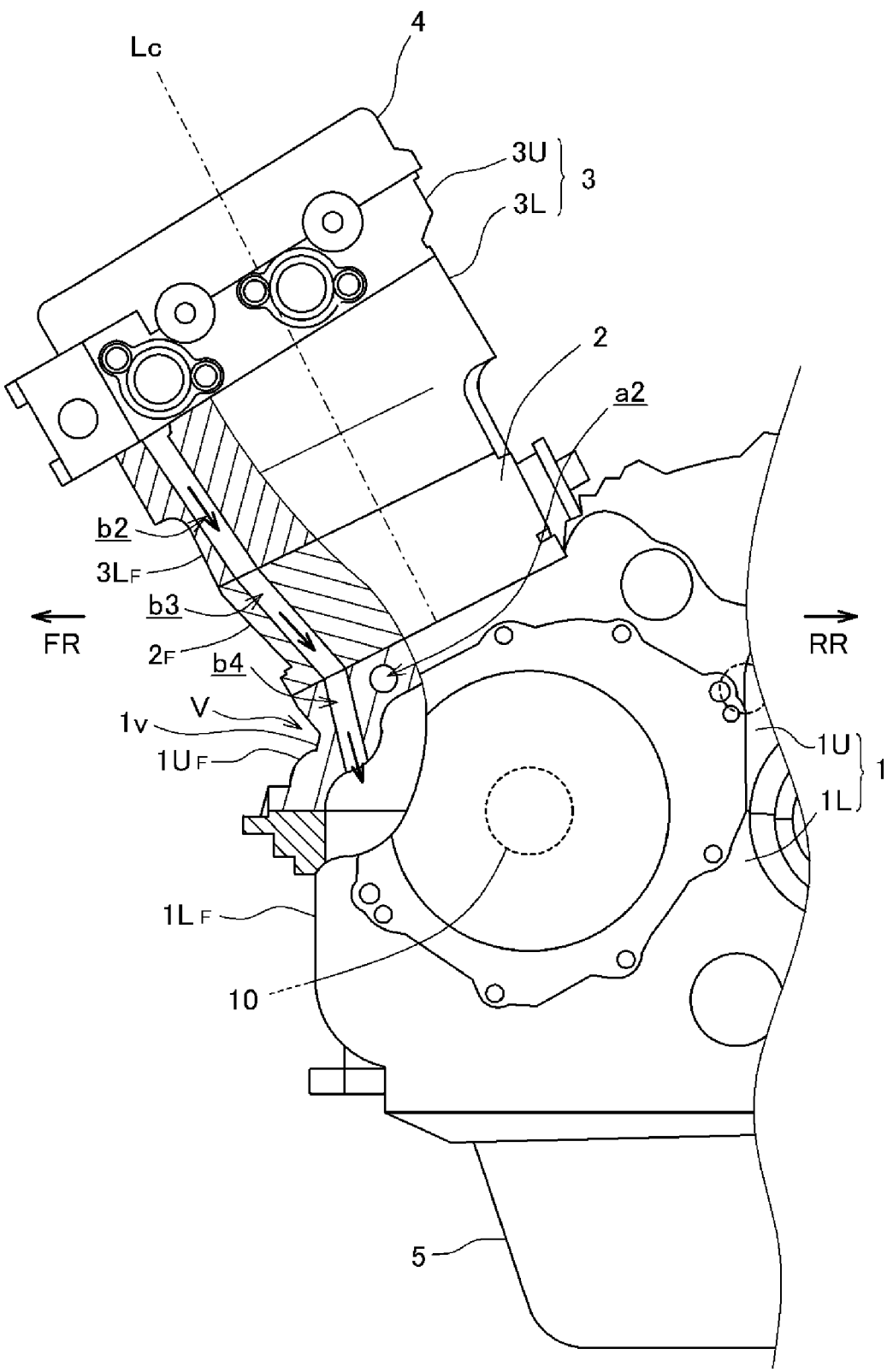
FIG. 24 is a left side elevational view, partly in section, of a front portion of the engine body of the internal combustion engine.

As illustrated in FIG. 24, a valley V that is oriented in the leftward and rightward directions is defined by and along a bent portion 1v that is formed by a substantially vertical wall as a front wall $1U_F$ of the upper crankcase member 1U and a forwardly inclined cylinder front wall $2_F$ of the cylinder block 2.

As illustrated in FIG. 3, an oil filter 21 is mounted on a lower portion of a front surface of the lower crankcase member 1L at a position spaced slightly to the right from the center thereof in the leftward and rightward direction.

The oil pump 20 pumps up oil stored in the oil pan 5 and delivers the oil under pressure through an oil passageway, not depicted, to the oil filter 21.

Figure 14:
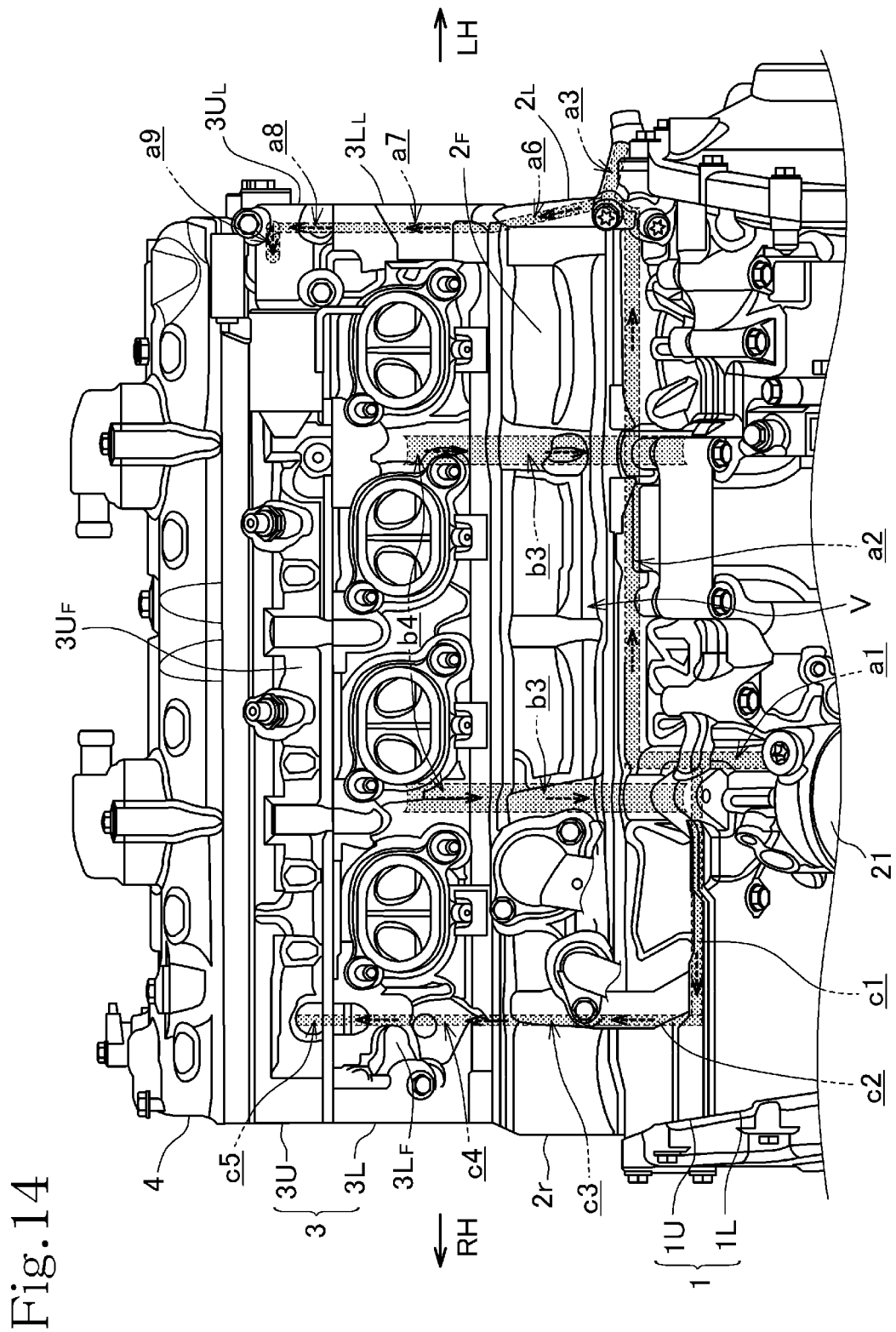
FIG. 14 is a fragmentary front elevational view of the internal combustion engine.

As illustrated in FIGS. 3 and 14, a first oil supply passageway a1 from the oil filter 21 is defined in a front wall $1L_F$ of the lower crankcase member 1L and the front wall $1U_F$ of the upper crankcase member 1U. The first oil supply passageway a1 extends upward along front surfaces of the front walls $1L_F$ and $1U_F$ toward a position spaced inward from the valley V in the front surface of the front wall $1U_F$ of the upper crankcase member 1U.

A second oil supply passageway a2 is defined in the front wall $1U_F$ of the upper crankcase member 1U and extends leftward from a downstream end of the first oil supply passageway a1 at the position spaced inward from the valley V in the upper crankcase member 1U along the valley V closely to the bent portion 1v that defines the valley V.

Figure 15:
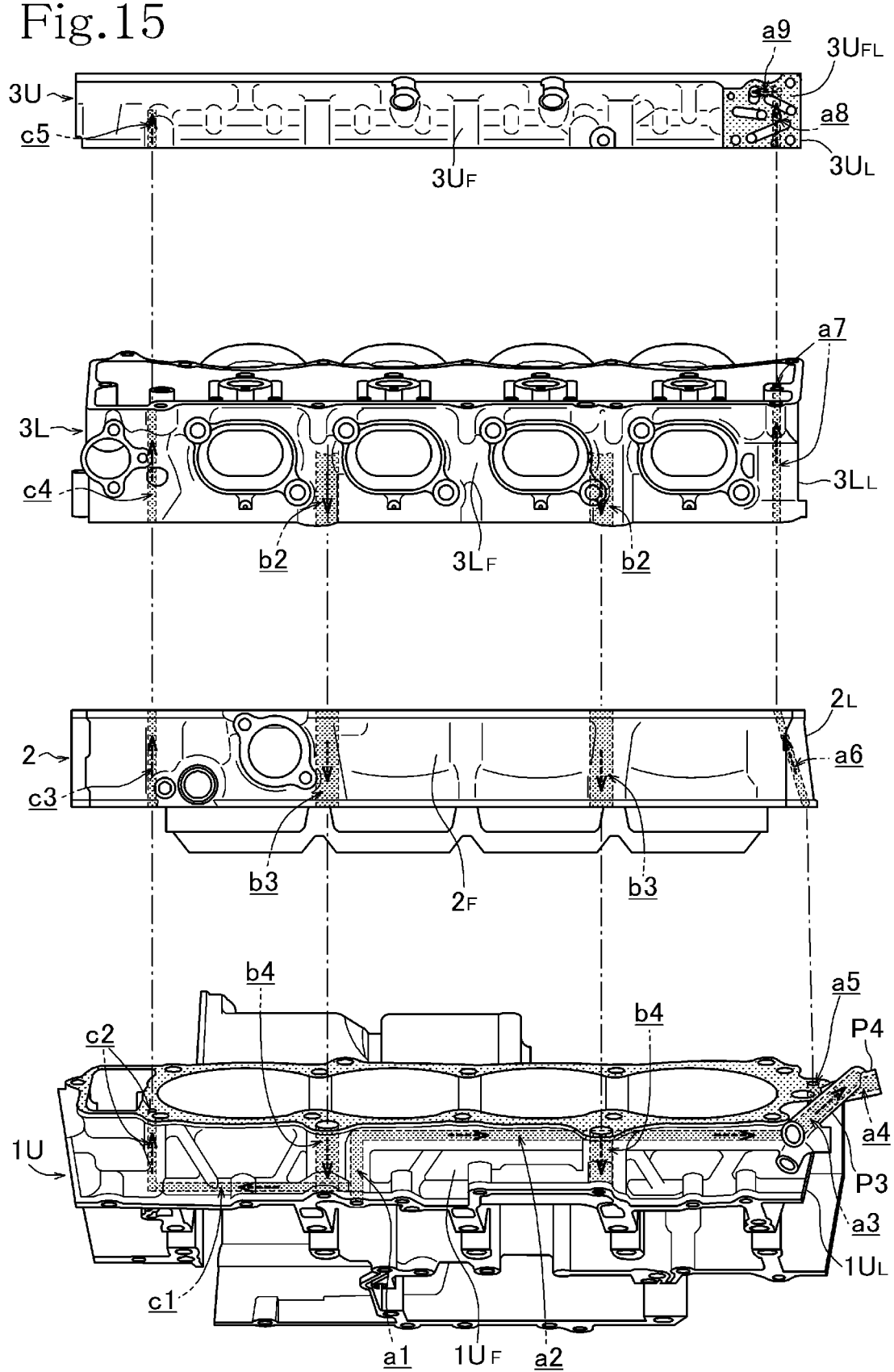
FIG. 15 is an exploded front elevational view of an engine body of the internal combustion engine.
Figure 16:
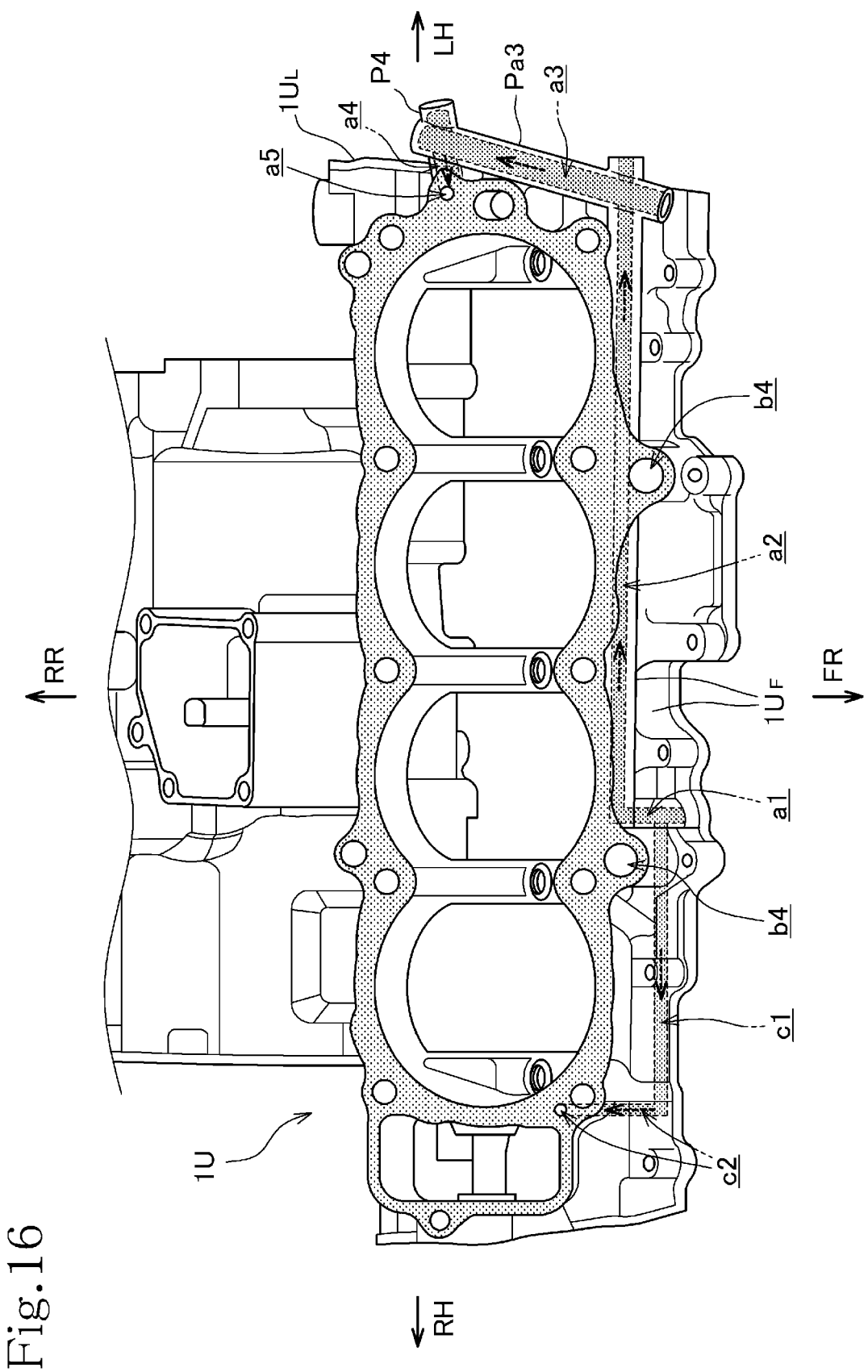
FIG. 16 is a plan view of an upper crankcase member of the internal combustion engine.

As illustrated in FIGS. 15 and 16, a third oil supply passageway a3 extends rearward from a left end, i.e., a downstream end, of the second oil supply passageway a2 along a left side wall $1U_L$ of the upper crankcase member 1U.

The third oil supply passageway a3 is provided as an outer tube in the form of an oil passageway tube Pa3 that defines the third oil supply passageway a3 therein, exposed on the left side wall $1U_L$ of the upper crankcase member 1U.

The third oil supply passageway a3 is defined along the left side wall $1U_L$ that is opposite a right side wall of the lower crankcase member 1U in which the cam chain chamber 3c where the cam chain 66 is disposed is partly defined.

A fourth oil supply passageway a4 is defined as an exposed outer tube P4 and extends from a rear end, i.e., a downstream end, of the third oil supply passageway a3 into the left side wall $1U_L$ of the upper crankcase member 1U.

A fifth oil supply passageway a5 is defined in the left side wall $1U_L$ of the upper crankcase member 1U and extends upward from the end of the fourth oil supply passageway a4 in the left side wall $1U_L$ to a mating surface of the upper crankcase member 1U that is mated to the cylinder block 2. The fifth oil supply passageway a5 has an upper end that is open at the mating surface of the upper crankcase member 1U that is mated to the cylinder block 2.

A sixth oil supply passageway a6 that extends vertically is defined in a left side wall $2_L$ of the cylinder block 2. The sixth oil supply passageway a6 has a lower end that is open at a mating surface of the cylinder block 2 that is mated to the upper crankcase member 1U. The open lower end of the sixth oil supply passageway a6 is aligned with the open upper end of the fifth oil supply passageway a5, so that the sixth oil supply passageway a6 is held in fluid communication with the fifth oil supply passageway a5.

The sixth oil supply passageway a6 has an upper end that is open at a mating surface of the cylinder block 2 that it mated to the lower cylinder head member 3L of the cylinder head 3.

The lower cylinder head member 3L has a left side wall $3L_L$ in which a vertically extending seventh oil supply passageway a7 is defined. The seventh oil supply passageway a7 has a lower end that is open at a mating surface of the lower cylinder head member 3L that is mated to the cylinder block 2. The open lower end of the seventh oil supply passageway a7 is aligned with the open upper end of the sixth oil supply passageway a6, so that the seventh oil supply passageway a7 is held in fluid communication with the sixth oil supply passageway a6.

The seventh oil supply passageway a7 has an upper end that is open at a mating surface of the lower cylinder head member 3L that mated to the upper cylinder head member 3U.

An eighth oil supply passageway a8 that extends vertically is defined in the left side wall $3U_L$ of the upper cylinder head member 3U. The eighth oil supply passageway a8 has a lower end that is open at a mating surface of the upper cylinder head member 3U that is mated to the lower cylinder head member 3L. The open lower end of the eight oil supply passageways a8 is aligned with the open upper end of the seventh oil supply passageway a7, so that the eighth oil supply passageway a8 is held in fluid communication with the seventh oil supply passageway a7.

The eighth oil supply passageway a8 has an upper end bent forward into a ninth oil supply passageway a9.

The ninth oil supply passageway a9 extends substantially horizontally forward from the upper end of the eighth oil supply passageway a8 and has a front end that is open at the left-end mating surface $3U_{FL}$ of the front face of the front side wall $3U_F$ of the upper cylinder head member 3U.

Specifically, as illustrated in FIG. 10, the ninth oil supply passageway a9 corresponds to the hydraulic pressure supply passageway $90_I$ and is open at the left-end mating surface $3U_{FL}$ of the front face of the upper cylinder head member 3U on which the linear solenoid-operated valve 91 is mounted.

The sixth oil supply passageway a6 and the seventh oil supply passageway a7 extend vertically along the left side walls $2_L$ and $3L_L$ of the cylinder block 2 and the lower cylinder head member 3L.

The sixth oil supply passageway a6 and the seventh oil supply passageway a7 are defined in the left side walls $2_L$ and $3L_L$ that are opposite to the right side walls of the cylinder block 2 and the lower cylinder head member 3L where the cam chain 66 is disposed.

Figure 21:
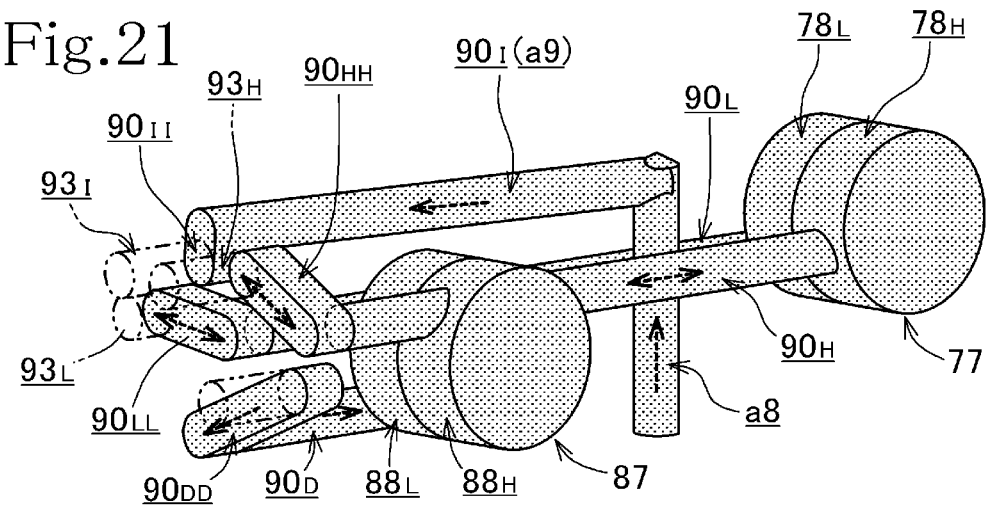
FIG. 21 is a perspective view of an oil flow channel in a left side wall of the upper cylinder head member.
Figure 22:
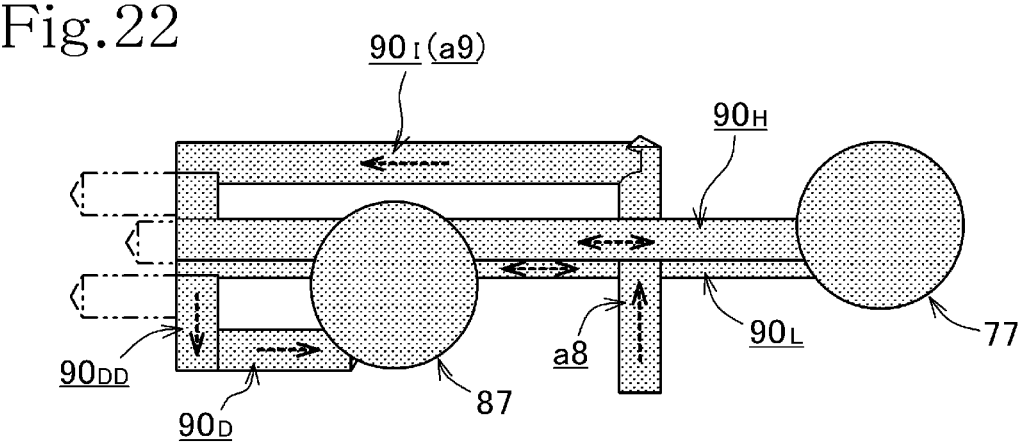
FIG. 22 is a left side elevational view of the oil flow channel.
Figure 23:
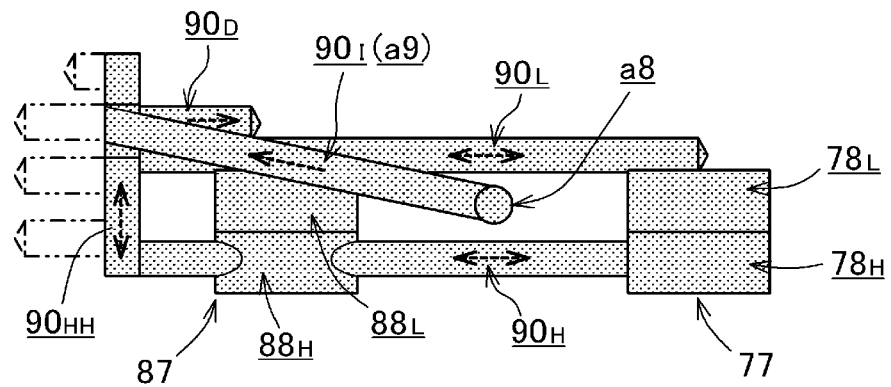
FIG. 23 is a plan view of the oil flow channel.

FIGS. 21 through 23 illustrate only the oil passageways in the left side wall $3U_L$ of the upper cylinder head member 3U.

The low-speed hydraulic chamber $88_L$ and the high-speed hydraulic chamber $88_H$ of the exhaust hydraulic actuator 87 and the low-speed hydraulic chamber $78_L$ and the high-speed hydraulic chamber $78_H$ of the intake hydraulic actuator 77 are arranged respectively in the front and rear positions. The low-speed hydraulic chambers $78_L$ and $88_L$ are held in fluid communication with each other by the low-speed supply/discharge oil passageway $90_L$, and the high-speed hydraulic chambers $78_H$ and $88_H$ are held in fluid communication with each other by the high-speed supply/discharge oil passageway $90_H$.

The low-speed supply/discharge oil passageway $90_L$ and the high-speed supply/discharge oil passageway $90_H$ extend forward and are held in fluid communication with the respective oblong grooves $90_{LL}$ and $90_{HH}$ that are open at the left-end mating surface $3U_{FL}$ of the upper cylinder head member 3U.

The low-speed supply/discharge oil passageway $90_L$ and the high-speed supply/discharge oil passageway $90_H$ are oriented in the forward and rearward directions and are disposed parallel to each other in respective left and right positions. The eighth oil supply passageway a8 extend vertically between the low-speed supply/discharge oil passageway $90_L$ and the high-speed supply/discharge oil passageway $90_H$.

The ninth oil supply passageway a9, i.e., the hydraulic pressure supply passageway $90_P$, that extends forward from the upper end of the eighth oil supply passageway a8 is held in fluid communication with the oblong groove $90_{II}$ that is open at the left-end mating surface $3U_{FL}$ of the upper cylinder head member 3U.

The drain oil passageway $90_D$ extends rearward from the oblong groove $90_{DD}$ that is open at the left-end mating surface $3U_{FL}$.

According to the above oil supply structure for supplying oil to the intake and exhaust hydraulic actuators 77 and 87, oil filtered by and discharged from the oil filter 21 flows upward through the first oil supply passageway a1 in the front wall $1U_F$ of the upper crankcase member 1U, then flows leftward in the second oil supply passageway a2 along the valley V, and thereafter flows rearward through the third oil supply passageway a3 along the left side wall $1U_L$ of the upper crankcase member 1U. Then, the oil flows through the fourth oil supply passageway a4 and the fifth oil supply passageway a5, and flows from the fifth oil supply passageway a5 upward successively through the sixth oil supply passageway a6 in the left side wall $2_L$ of the cylinder block 2, the seventh oil supply passageway a7 in the left side wall $3L_L$ of the lower cylinder head member 3L, and the eighth oil supply passageway a8 in the left side wall $3U_L$ of the upper cylinder head member 3U.

The oil that has reached the upper end of the eighth oil supply passageway a8 in the left side wall $3U_L$ of the upper cylinder head member 3U then flows forward through the ninth oil supply passageway a9, i.e., the hydraulic pressure supply passageway $90_P$, from which the oil flows into the sleeve 93 of the linear solenoid-operated valve 91.

The oil that has flowed into the sleeve 93 of the linear solenoid-operated valve 91 is controlled by the linear solenoid-operated valve 91 to flow via the low-speed supply/discharge oil passageway $90_L$ or the high-speed supply/discharge oil passageway $90_H$ to the intake hydraulic actuator 77 and the exhaust hydraulic actuator 87, operating the intake hydraulic actuator 77 and the exhaust hydraulic actuator 87.

Figure 20:
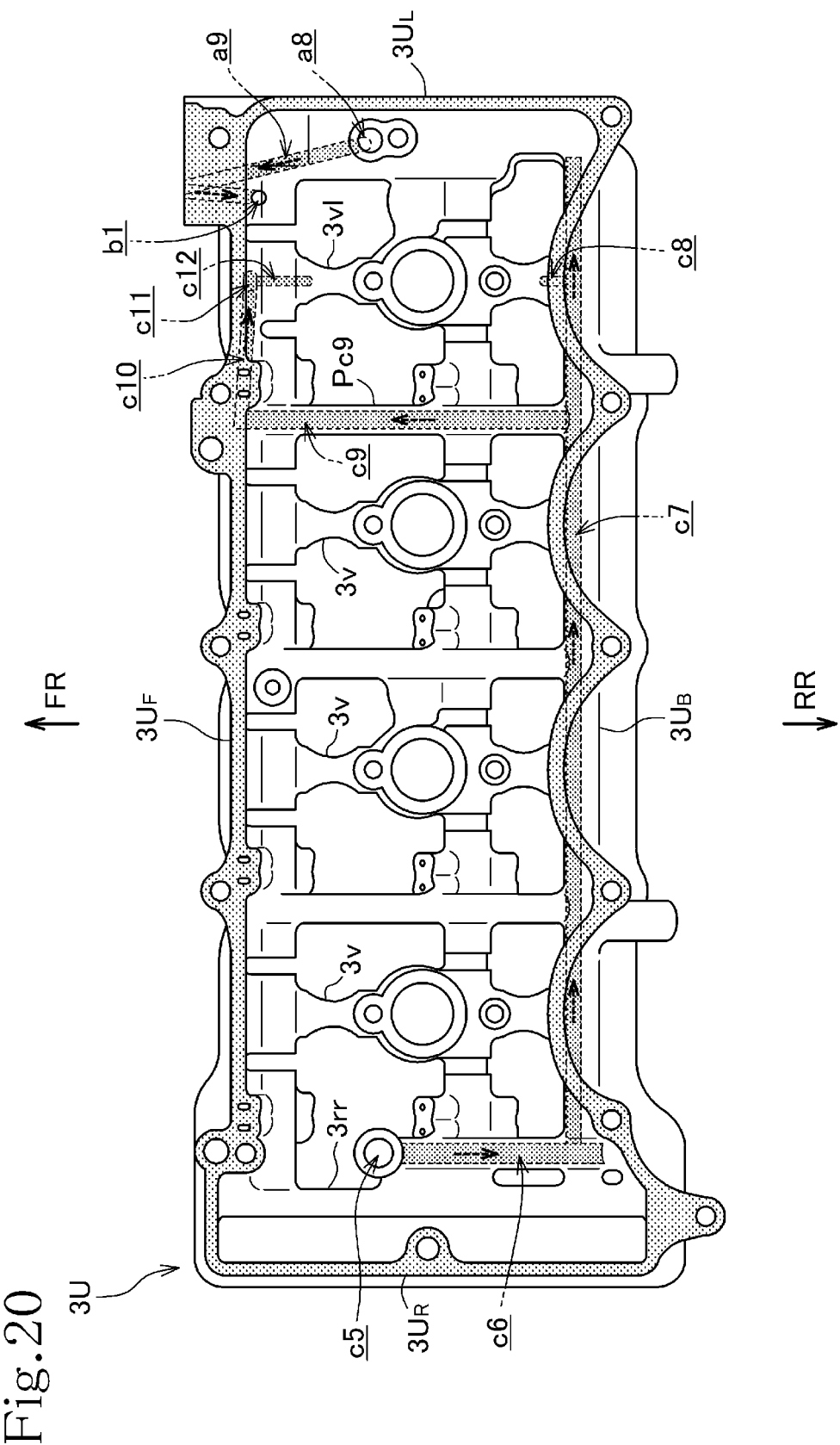
FIG. 20 is a bottom view of the upper cylinder head member.

The drain oil passageway $90_D$ in the upper cylinder head member 3U extends a short distance rearward from the oblong groove $90_{DD}$, is then bent downward, and is open downward as an oil discharge hole or first return oil passageway b1 (see FIG. 20).

Figure 18:
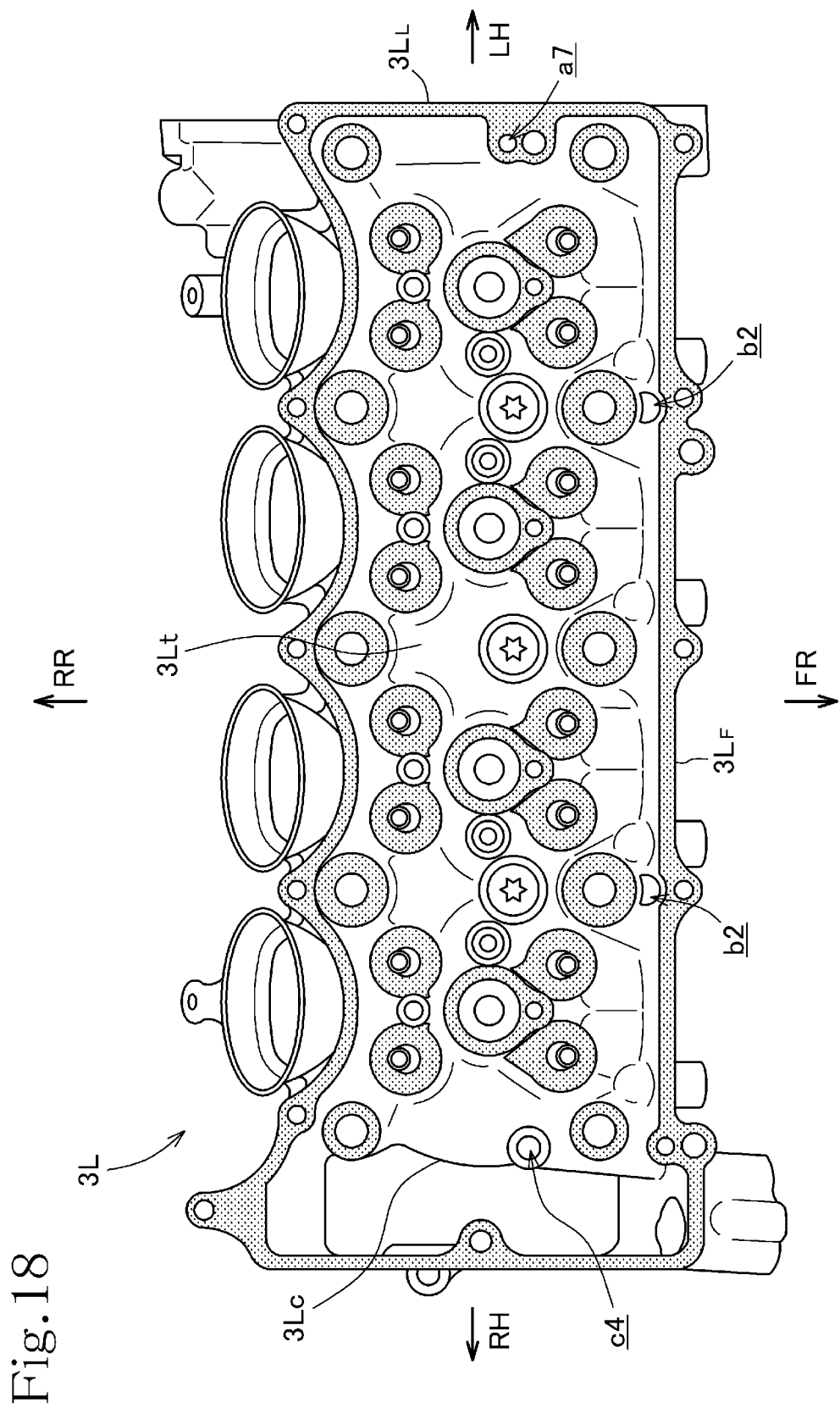
FIG. 18 is a plan view of a lower cylinder head member of the internal combustion engine.

Oil that is discharged from the oil discharge hole b1 drops over the upper surface of an upper lid wall 3Lt, illustrated in FIG. 18, of the lower cylinder head member 3L that partly defines the combustion chamber 30.

The lower cylinder head member 3L is inclined forward and hence the upper lid wall 3Lt is inclined forward and downward. Therefore, the oil that is discharged onto the upper surface of the upper lid wall 3Lt flows forward and is collected on a corner that is defined by the upper lid wall 3Lt and a front side wall $3L_F$ of the lower cylinder head member 3L.

With reference to FIGS. 15 and 18, two left and right second return oil passageways b2 are defined in and extend downward through the front side wall $3L_F$ of the lower cylinder head member 3L, and have upper ends that are open at the corner defined by the upper lid wall 3Lt and the front side wall $3L_F$ of the lower cylinder head member 3L.

Figure 17:
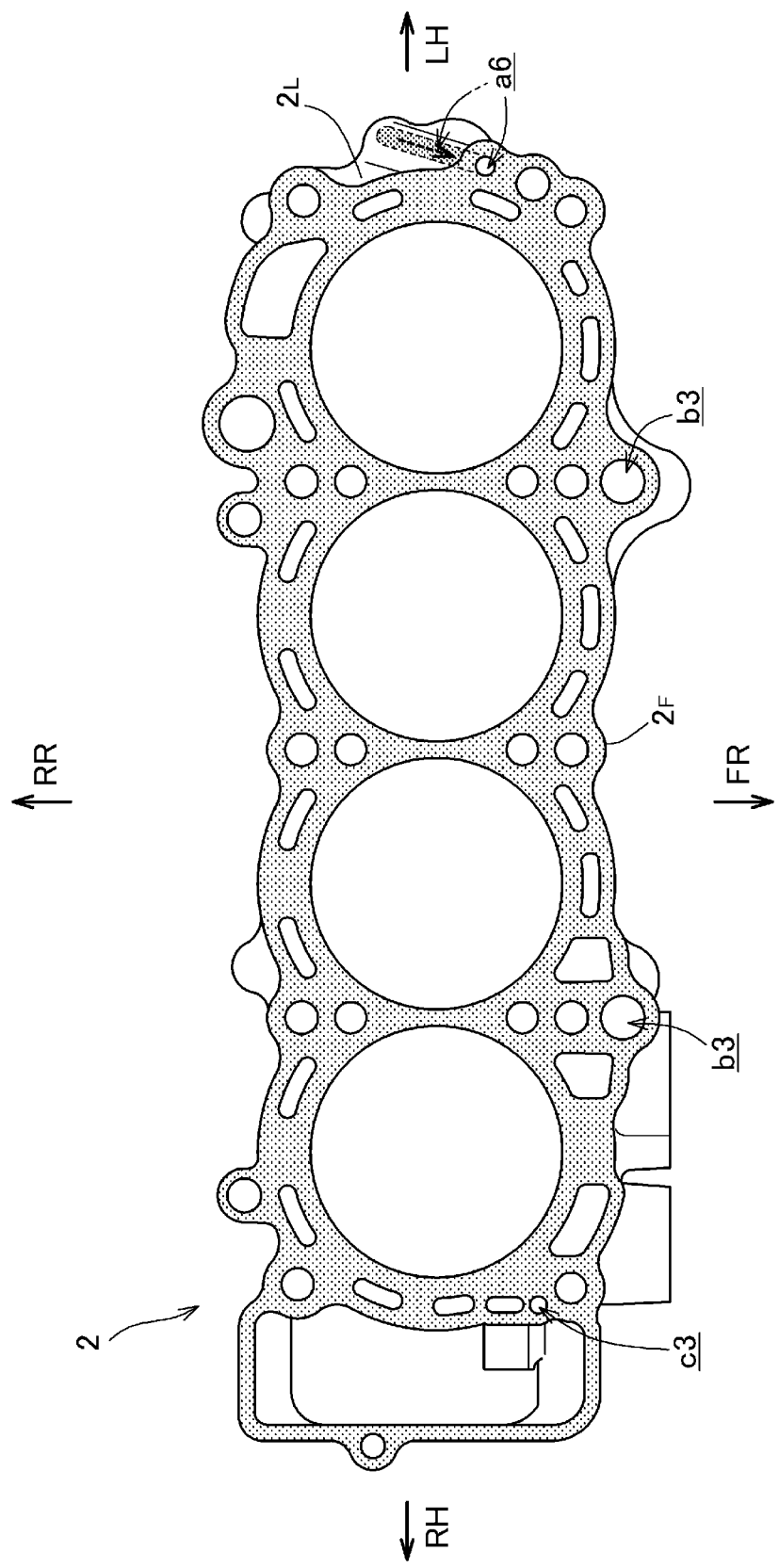
FIG. 17 is a plan view of a cylinder block of the internal combustion engine.

As illustrated in FIGS. 15 and 17, two left and right third return oil passageways b3 are defined in and extend downward through the cylinder front wall $2_F$ of the cylinder block 2 that is joined to the lower end of the lower cylinder head member 3L. The third return oil passageways b3 are held in fluid communication with the second return oil passageways b2.

As illustrated in FIGS. 15 and 16, two left and right fourth return oil passageways b4 are defined in and extend downward through the front wall $1U_F$ of the upper crankcase member 1U that is joined to the lower end of the cylinder block 2. The fourth return oil passageways b4 are held in fluid communication with the third return oil passageways b3.

As illustrated in FIG. 24, the second, third, and fourth return oil passageways b2, b3, and b4 extend vertically and obliquely forward along the front wall of the engine body.

The fourth return oil passageway b4 in the upper crankcase member 1U is bent nearly vertically from the third return oil passageway b3 that is forwardly inclined in the cylinder block 2. The fourth return oil passageway b4 has a lower end that is open into a crank chamber defined in the crankcase 1.

Oil discharged from the oil discharge hole or first return oil passageway b1 in the upper cylinder head member 3U flows through the second return oil passageway b2 in the lower cylinder head member 3L, the third return oil passageway b3 in the cylinder block 2, and the fourth return oil passageway b4 in the upper crankcase member 1U, and then returns through the crank chamber to the oil pan 5.

As illustrated in FIG. 24, the second oil supply passageway a2 that extends in the leftward and rightward directions along the valley V is positioned inward of, i.e., behind, the fourth return oil passageway b4.

An oil passageway structure for supplying oil to bearings by which the intake camshaft 42 and the exhaust camshaft 52 of the variable valve operating mechanism 40 are rotatably supported will be described hereinafter.

The intake camshaft 42 and the exhaust camshaft 52 that lie parallel to each other are oriented in the leftward and rightward directions, and are fitted in and rotatably supported by the semi-arcuate bearing surfaces $3vf$ of the bearing walls $3v$ and $3vr$ of the upper cylinder head member 3U. The intake camshaft 42 and the exhaust camshaft 52 are sandwiched between the upper cylinder head member 3U and the camshaft holder 33.

As illustrated in FIG. 3, a first oil supply passage $c1$ is branched from the first oil supply passageway $a1$, which extends from the oil filter 21 mounted on the front surface of the lower crankcase member 1L, upward along the front surfaces of the front wall $1L_F$ of the lower crankcase member 1L and the front wall $1U_F$ of the upper crankcase member 1U. The first oil supply passage $c1$ extends rightward in the front wall $1U_F$ of the upper crankcase member 1U.

As illustrated in FIGS. 14 through 16, the first oil supply passage $c1$ in the upper crankcase member 1U has a right end bent upward into a second oil supply passage $c2$.

The second oil supply passage $c2$ in the upper crankcase member 1U has an upper end that is open at the mating surface of the upper crankcase member 1U that is mated to the cylinder block 2.

A vertically extending third oil supply passage $c3$ is defined in a right portion of the cylinder front wall $2_F$ of the cylinder block 2. The third oil supply passage $c3$ has a lower end that is open at the mating surface of the cylinder block 2 that is mated to the upper crankcase member 1U. The open lower end of the third oil supply passage $c3$ is aligned with the open upper end of the second oil supply passage $c2$ in the upper crankcase member 1U, so that the third oil supply passage $c3$ is held in fluid communication with the second oil supply passage $c2$.

The third oil supply passage $c3$ has an upper end that is open at the mating surface of the cylinder block 2 that is mated to the lower cylinder head member 3L.

A vertically extending fourth oil supply passage $c4$ is defined in an inner side wall $3Lc$ of the cam chain chamber $3c$ in the lower cylinder head member 3L. The fourth oil supply passage $c4$ has a lower end that is open at the mating surface of the lower cylinder head member 3L that is mated to the cylinder block 2. The open lower end of the fourth oil supply passage $c4$ is aligned with the open upper end of the third oil supply passage $c3$ in the cylinder block 2, so that the fourth oil supply passage $c4$ is held in fluid communication with the third oil supply passage $c3$.

The fourth oil supply passage $c4$ has an upper end that is open at the mating surface of the lower cylinder head member 3L that is mated to the upper cylinder head member 3U.

The upper cylinder head member 3U includes the five bearing walls $3v$ ($3vr$) (FIG. 5) extending between the front side wall $3U_F$ and the rear side wall $3U_B$ and juxtaposed in the leftward and rightward directions. The intake camshaft 42 and the exhaust camshaft 52 are fitted in the front and rear bearing surfaces $3vf$ of the five bearing walls $3v$ ($3vr$, $3vl$) and sandwiched between and rotatably supported by the upper cylinder head member 3U and the camshaft holder 33.

Figure 19:
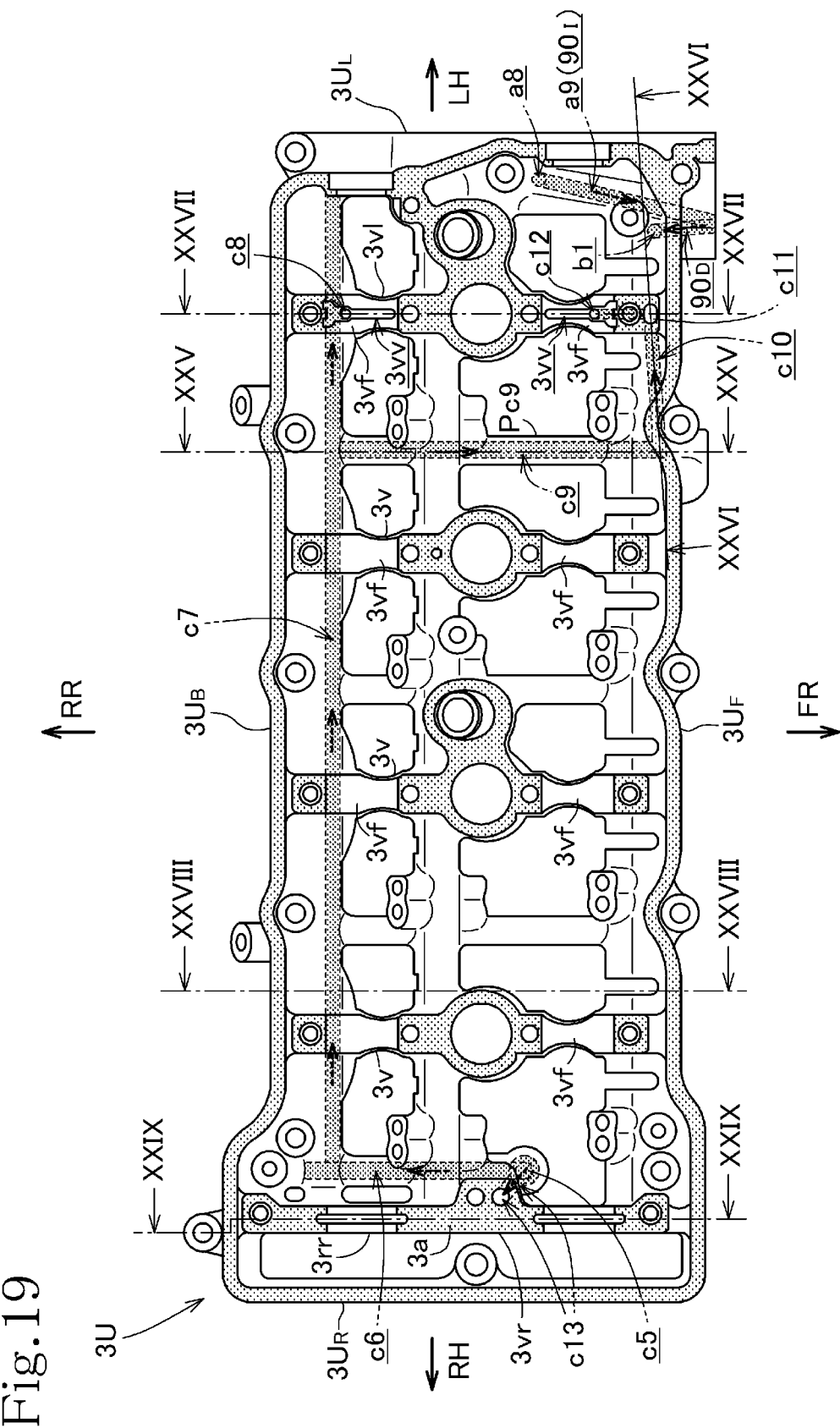
FIG. 19 is a plan view of the upper cylinder head member of the internal combustion engine.

As illustrated in FIG. 15 and FIGS. 19 and 20, a fifth oil supply passage $c5$ that extends upward from a lower surface of the upper cylinder head member 3U is defined in the rightmost bearing wall $3vr$ along the cam chain chamber $3c$ in the upper cylinder head member 3U. The fifth oil supply passage $c5$ has a lower end that is open at the mating surface of the upper cylinder head member 3U that is mated to the lower cylinder head member 3L. The open lower end of the fifth oil supply passage $c5$ is aligned with the open upper end of the fourth oil supply passage $c4$ in the lower cylinder head member 3L, so that the fifth oil supply passage $c5$ is held in fluid communication with the fourth oil supply passage $c4$.

The fifth oil supply passage $c5$ has an upper end closed, and a sixth oil supply passage $c6$ extends rearward from an upper end portion of the fifth oil supply passage $c5$ to the rear side wall $3U_B$ of the upper cylinder head member 3U.

The rear side wall $3U_B$ of the upper cylinder head member 3U has a seventh oil supply passage $c7$ defined therein that is an inter-bearing wall fluid communication oil passage extending leftward from the rightmost bearing wall $3vr$ to the leftmost bearing wall $3v$, which is denoted by $3vl$.

In other words, the seventh oil supply passage or the inter-bearing wall fluid communication oil passage $c7$ is defined in the rear side wall $3U_B$ that is opposite the front side wall $3U_F$ from which the exhaust pipes 125 extend.

The seventh oil supply passage $c7$ has a right end held in fluid communication with the sixth oil supply passage $c6$.

Figure 25:
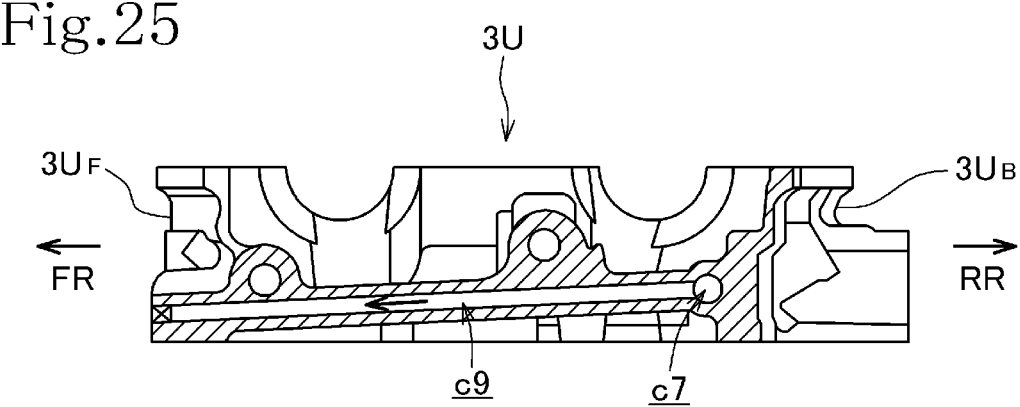
FIG. 25 is a sectional view of the upper cylinder head member, taken along line XXV-XXV of FIG. 19.
Figure 27:
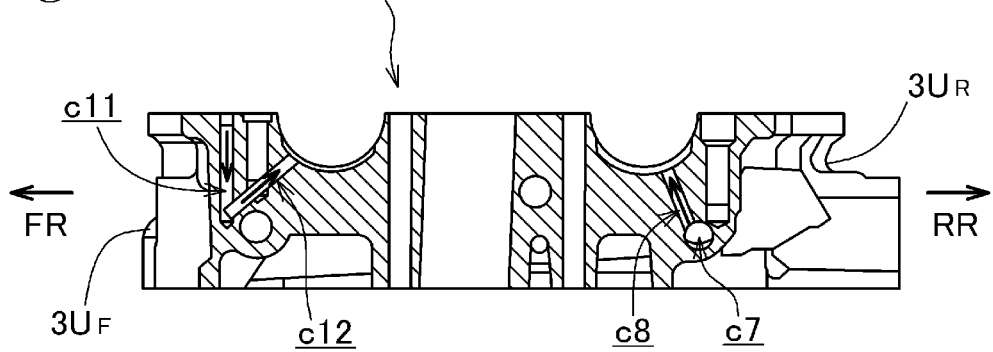
FIG. 27 is a sectional view of the upper cylinder head member, taken along line XXVII-XXVII of FIG. 19.
Figure 28:
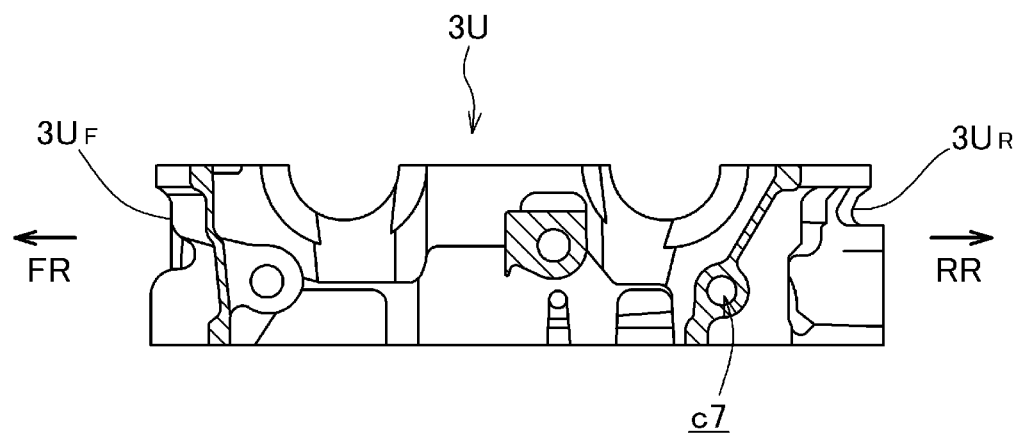
FIG. 28 is a sectional view of the upper cylinder head member, taken along line XXVIII-XXVIII of FIG. 19.
Figure 29:
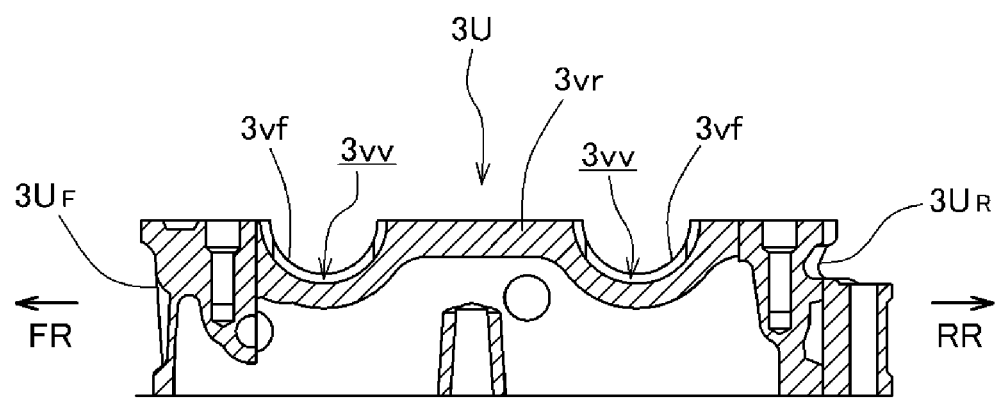
FIG. 29 is a sectional view of the upper cylinder head member, taken along line XXIX-XXIX of FIG. 19.

As illustrated in FIGS. 25 and 27, the seventh oil supply passage or the inter-bearing wall fluid communication oil passage $c7$ is disposed below the semi-arcuate bearing surfaces $3vf$ of each of the bearing walls $3v$.

The front and rear semi-arcuate bearing surfaces $3vf$ of the leftmost bearing wall $3vl$ have respective semi-arcuate grooves $3vv$ defined therein.

As illustrated in FIG. 27, an eighth oil supply passage $c8$ as a first bearing wall oil passage is defined in the bearing wall $3vl$. The eighth oil supply passage $c8$ is branched from the seventh oil supply passage or the inter-bearing wall fluid communication oil passage $c7$ and extends obliquely upward, and has an upper end that is open in the semi-arcuate groove $3vv$ in the rear bearing surface $3vf$ of the bearing wall $3vl$.

As illustrated in FIG. 19, a joint oil passage tube $Pc9$ extends from the rear side wall $3U_B$, in which the seventh oil supply passage or the inter-bearing wall fluid communication oil passage $c7$ is defined, to the front side wall $3U_F$, and is integrally formed with the front side wall $3U_F$ and the rear side wall $3U_B$.

The joint oil passage tube $Pc9$ is disposed next to the leftmost bearing wall $3vl$ and on the right side thereof. As illustrated in FIGS. 19 and 25, the joint oil passage tube $Pc9$ defines therein a ninth oil supply passage $c9$ that is branched as a joint oil passage from the seventh oil supply passage or the inter-bearing wall fluid communication oil passage $c7$.

As illustrated in FIG. 25, the ninth oil supply passage $c9$ extends forward and slightly downward from the seventh oil supply passage $c7$ in the rear side wall $3U_B$ to the front side wall $3U_F$.

Figure 26:
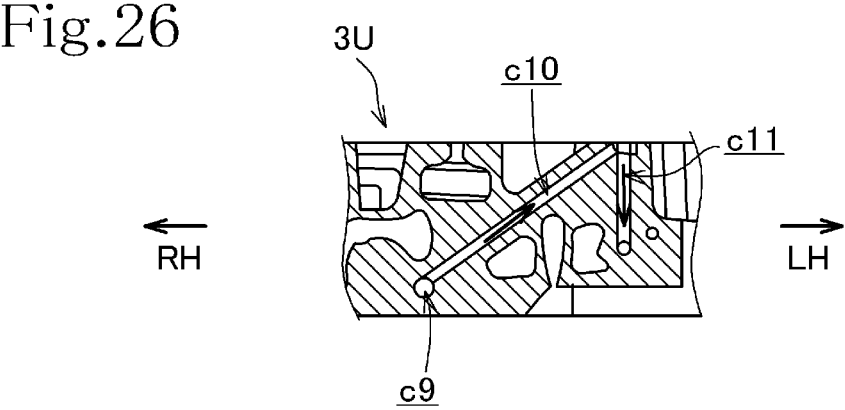
FIG. 26 is a sectional view of the upper cylinder head member, taken along line XXVI-XXVI of FIG. 19.

As illustrated in FIG. 26, a tenth oil supply passage $c10$ is defined as a side wall oil passageway in the front side wall $3U_F$ and extends from the front end of the ninth oil supply passage $c9$ obliquely leftward and upward to the bearing wall $3vl$.

An eleventh oil supply passage $c11$ extends as a side wall oil passageway downward from the upper end of the tenth oil supply passage $c10$ (see FIG. 26).

As illustrated in FIG. 27, a twelfth oil supply passage $c12$ as a second bearing wall oil passage extends from the lower end of the eleventh oil supply passage $c11$ obliquely upward and has an upper end that is open in the semi-arcuate groove $3vv$ in the front bearing surface $3vf$ of the bearing wall $3vl$.

As described above, the ninth oil supply passage c9 as the joint oil passage, the tenth oil supply passage c10 and the eleventh oil supply passageway c11, as the side wall oil passages, and the twelfth oil supply passage c12 as the second bearing wall oil passage are integrally defined in the upper cylinder head member 3U.

As illustrated in FIG. 5, the intake camshaft 42 and the exhaust camshaft 52 are rotatably supported by the five bearing walls 3v (3vr, 3vl) of the upper cylinder head member 3U. Further, the joint oil passage tube Pc9 is positioned below the lead-groove tubular portions 43D adjacent to the cam lobes 43A and 43B of the intake cam carriers 43 that are axially slidably fitted over the intake camshaft 42 and below the lead-groove tubular portions 53D adjacent to the cam lobes 53A and 53B of the exhaust cam carriers 53 that are axially slidably fitted over the exhaust camshaft 52.

As illustrated in FIG. 19, a thirteenth oil supply passage c13 is branched from the fifth oil passage c5 that is vertically defined in the rightmost bearing wall 3vr of the upper cylinder head 3U and extends obliquely upward. The thirteenth oil supply passage c13 has an upper end that is open at a mating surface 3a of the bearing wall 3vr.

The camshaft holder 33 has a mating surface 33a that is placed on and mated to the mating surface 3a of the bearing wall 3vr. The intake camshaft 42 and the exhaust camshaft 52 are sandwiched between and rotatably supported by the camshaft holder 33 and the bearing wall 3vr.

Figure 30:
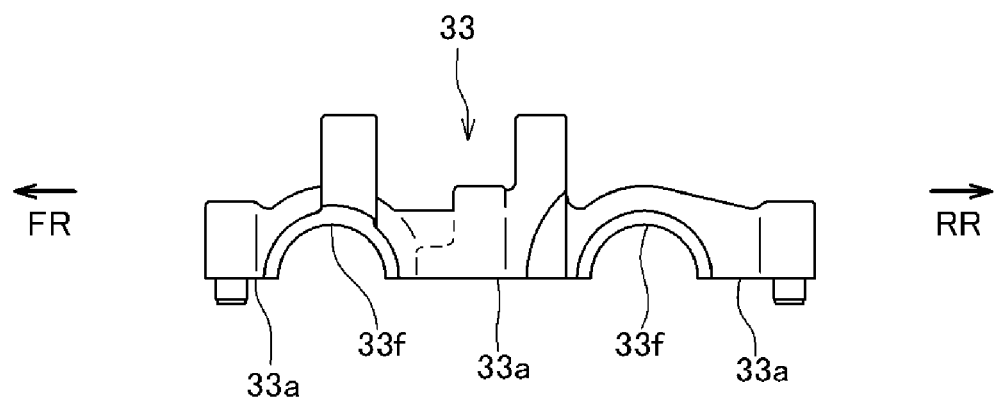
FIG. 30 is a left side elevational view of a camshaft holder.
Figure 31:
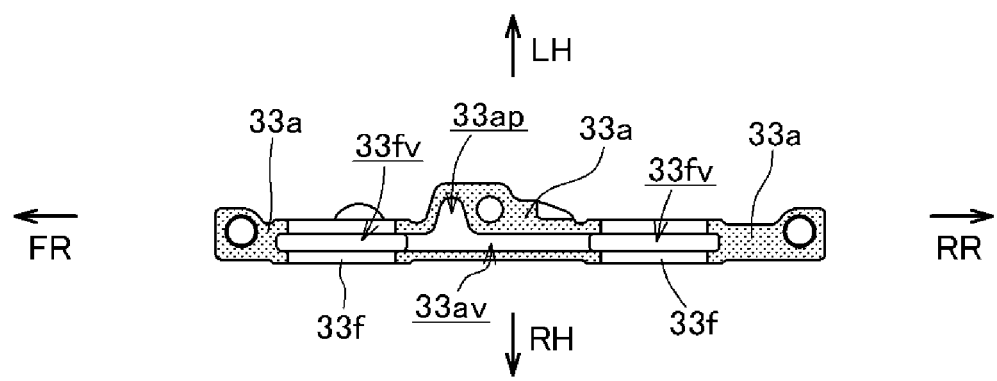
FIG. 31 is a bottom view of the camshaft holder.

As illustrated in FIGS. 30 and 31, the camshaft holder 33 has a pair of front and rear semi-arcuate bearing surfaces 33f that face the front and rear semi-arcuate bearing surfaces 3vf of the bearing wall 33vr.

The front and rear semi-arcuate bearing surfaces 33f have respective front and rear semi-arcuate grooves 33fv defined therein.

The mating surface 33a of the camshaft holder 33 is positioned between the front and rear semi-arcuate bearing surfaces 33f and has a fluid communication groove 33av defined therein that provides fluid communication between the front and rear semi-arcuate grooves 33fv.

The fluid communication groove 33av has a portion bulging leftward as a bulging portion 33ap.

When the camshaft holder 33 is superposed on the bearing wall 3vr, the bulging portion 33ap of the fluid communication groove 33av in the camshaft holder 33 faces the open upper end of the upper end of the thirteenth oil supply passage c13 that is open at the mating surface 3a of the bearing wall 3vr.

Therefore, oil that flows out of the third oil supply passage c13 flows into the bulging portion 33ap in the camshaft holder 33, then flows from the bulging portion 33ap into the fluid communication groove 33av, and is supplied therefrom to the front and rear semi-arcuate grooves 33fv, thereby lubricating the corresponding journals of the intake camshaft 42 and the exhaust camshaft 52.

According to the above oil supply passage structure for supplying oil to the bearings, oil filtered by and discharged from the oil filter 21 flows upward through the first oil supply passageway a1 in the front wall 1U$_F$ of the upper crankcase member 1U, then flows rightward through the first oil supply passage c1 that is branched rightward from the first oil supply passageway a1, flows from the right end of the upper end of the first oil supply passage c1 upward through the second oil supply passage c2, and then flows from the second oil supply passage c2 upward successively through the fourth oil supply passage c4 in the lower cylinder head member 3L and the fifth oil supply passage c5 in the upper cylinder head member 3U.

The oil that has reached the upper end of the fifth oil supply passage c5 in the upper cylinder head member 3U then flows rearward through the sixth oil supply passage c6 in the bearing wall 3vr, from which the oil flows leftward through the seventh oil supply passage c7 in the rear side wall 3U$_B$.

The oil that has flowed through seventh oil supply passage c7 flows through the eighth oil supply passage c8 branched in the leftmost bearing wall 3vl, and flows therefrom into the semi-arcuate groove 3vv in the rear bearing surface 3vf of the bearing wall 3vl, thereby lubricating the rear bearing surface 3vf.

The oil that has flowed through seventh oil supply passage c7 is branched into the ninth oil supply passage c9 in the joint oil passageway tube Pc9 and flows forward therethrough to the front side wall 3U$_F$. The oil then flows successively through the tenth oil supply passage c10 and the eleventh oil supply passage c11 in the front side wall 3U$_F$, and then through the twelfth oil supply passage c12 in the bearing wall 3vl, from which the oil flows into the semi-arcuate groove 3vv in the front bearing surface 3vf of the bearing wall 3vl, thereby lubricating the front bearing surface 3vf.

Furthermore, the oil flowing from the thirteenth oil supply passage c13 branched from the fifth oil supply passage c5 in the rightmost bearing wall 3vr of the upper cylinder head 3U flows into the fluid communication groove 33av in the camshaft holder 33, from which the oil is distributed into the front and rear semi-arcuate grooves 33fv, thereby lubricating the front and rear bearing surfaces 33f of the camshaft holder 33 and the front and rear bearing surfaces 3vf of the bearing wall 3vr.

The oil passageway structure for internal combustion engines according to the above embodiment of the present invention has the following effects or advantages:

As illustrated in FIG. 19, the seventh oil supply passage or the inter-bearing wall fluid communication oil passage c7 that provides fluid communication between the bearing walls 3v, 3vl, and 3vr extending between the front side wall 3U$_F$ and the rear side wall 3U$_B$ of the upper cylinder head member 3U for allowing oil to flow therebetween is defined in the rear side wall 3U$_B$, and the eighth oil supply passage or the first bearing wall oil passage c8 branched from the seventh oil supply passage or the inter-bearing wall fluid communication oil passage c7 for supplying oil to the bearing surfaces 3vf of the bearing wall 3vl is integrally defined in the bearing wall 3vl. Consequently, the oil passageway structure is free from oil leakage, can be made up of a reduced number of parts, can be assembled in a reduced number of man-hours, can be produced with increased productivity, and is low in cost.

As illustrated in FIG. 27, as the seventh oil supply passage or the inter-bearing wall fluid communication oil passage c7 is disposed below the semi-arcuate bearing surfaces 3vf of the bearing wall 3vl, air that may have been introduced into the oil in the seventh oil supply passage or the inter-bearing wall fluid communication oil passageway c7 is likely to escape to the bearing surfaces 3vf.

With reference to FIGS. 2 and 19, the rear side wall 3U$_B$ in which the seventh oil supply passage or the inter-bearing wall fluid communication oil passage c7 is formed is opposite the front side wall 3U$_F$ from which the exhaust pipes 125 extend. Consequently, the oil in the seventh oil supply passage or the inter-bearing wall fluid communication oil passage c7, which is formed in the rear side wall 3U$_B$ opposite the front side wall $3U_F$ that tends to be heated to high temperatures by the exhaust pipes 125 extending from the front side wall $3U_F$, is prevented from being heated.

As illustrated in FIG. 19, in the variable valve operating mechanism 40, the two parallel camshafts 42 and 52 are rotatably supported by the bearing walls 3v, 3vl, and 3vr. The joint oil passage tube Pc9 extends from the rear side wall $3U_B$, in which the seventh oil supply passage or the inter-bearing wall fluid communication oil passage c7 is formed, to the front side wall $3U_F$, and is integrally formed with the front side wall $3U_F$ and the rear side wall $3U_B$. The ninth oil supply passage or the joint oil passage c9 that is branched from the seventh oil supply passage or the inter-bearing wall fluid communication oil passage c7 is defined in the joint oil passage tube Pc9. The tenth oil supply passage or the side wall oil passage c10 that extends from the ninth oil supply passage or joint oil passage c9 to the bearing wall 3vl is defined in the front side wall $3U_F$. The twelfth oil supply passage or the second bearing wall oil passage c12, which supplies oil from the tenth oil supply passage or the side wall oil passage c10 to the bearing surface 3vf, near the front side wall $3U_F$, of the bearing wall 3vl, is defined in the bearing wall 3vl.

In other words, since the ninth oil supply passage or the joint oil passage c9, the tenth oil supply passage or the side wall oil passage c10, and the twelfth oil supply passage or the second bearing wall oil passage c12 are integrally defined in the upper cylinder head member 3U, the oil passage structure can be made up of a reduced number of parts, can be assembled in a reduced number of man-hours, and can be produced with increased productivity.

As illustrated in FIG. 5, the intake camshaft 42 and the exhaust camshaft 52 are rotatably supported by the five bearing walls 3v (3vr, 3vl) of the upper cylinder head member 3U, and the joint oil passage tube Pc9 is positioned below the lead-groove tubular portions 43D adjacent to the cam lobes 43A and 43B of the intake cam carriers 43 that are axially slidably fitted over the intake camshaft 42 and the lead-groove tubular portions 53D adjacent to the cam lobes 53A and 53B of the exhaust cam carriers 53 axially slidably fitted over the exhaust camshaft 52. Consequently, the joint oil passage tube Pc9 can be disposed closely to the intake cam carriers 43 and the exhaust cam carriers 53, and the internal combustion engine E can be reduced in size by the effective utilization of space.

According to the present embodiment, the bearing surfaces 3vf of the bearing wall 3vl is supplied with oil using the eighth oil supply passage or the first bearing wall oil passage c8 and the joint oil passageway tube Pc9 that has the ninth oil supply passage or joint oil passage c9. However, first bearing wall oil passages corresponding to or equivalent to the eighth oil supply passage or the first bearing wall oil passage c8 and joint oil passages corresponding to or equivalent to the ninth oil supply passage or joint oil passage c9 may be added to supply oil to the bearing surfaces 3vf of the three bearing walls 3v between the leftmost and rightmost bearing walls 3vl and 3vr.

The seventh oil supply passage or the inter-bearing wall fluid communication oil passage c7 is illustrated as being defined in the rear side wall $3U_B$ of the upper cylinder head member 3U in the above embodiment. However, grooves that face each other may be defined in the mating surfaces of the lower cylinder head member 3L and the upper cylinder head member 3U, and may be combined with each other to form the seventh oil supply passage or the inter-bearing wall fluid communication oil passage c7.

An oil passageway structure for internal combustion engines according to a second embodiment of the present invention will hereinafter be described with reference to FIGS. 32 through 35.

The oil passageway structure for internal combustion engines according to the second embodiment is generally of the same construction as the oil passageway structure for internal combustion engines according to the first embodiment described above except for part of the cylinder head 3. Those parts of the oil passage structure according to the second embodiment which are identical to those of the oil passage structure according to the first embodiment are denoted by identical reference signs, and will not be described in detail below.

The crankcase 1 and the cylinder block 2 according to the second embodiment are identical to those according to the first embodiment. The vertically split members, i.e., the upper cylinder head member 3U and the lower cylinder head member 3L, of the cylinder head 3 are substantially the same as, but are different in part from, those according to the first embodiment.

Figure 32:
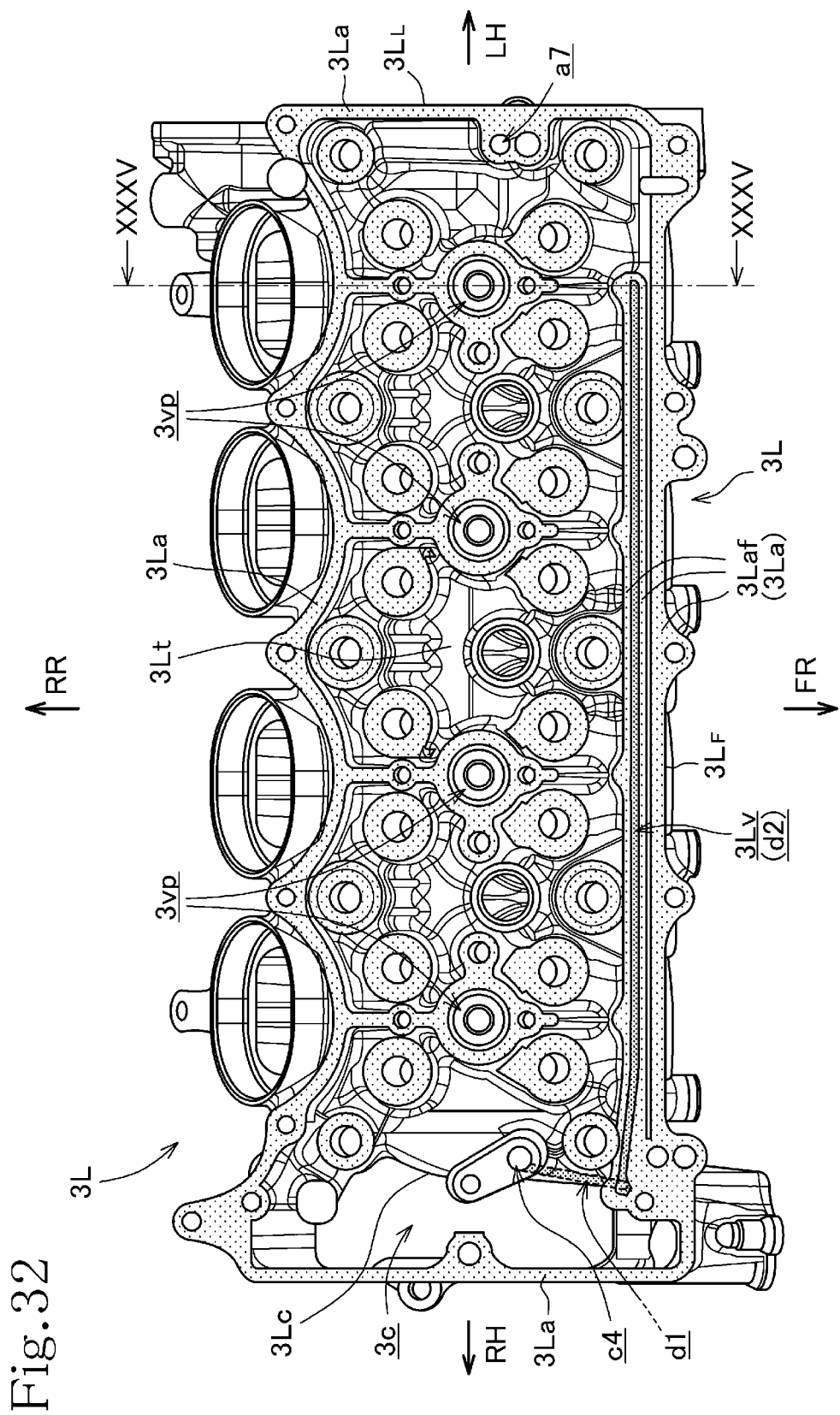
FIG. 32 is a plan view of a lower cylinder head member of an internal combustion engine that incorporates an oil passageway structure according to another embodiment of the present invention.

As illustrated in FIG. 32, the lower cylinder head member 3L has a groove 3Lv defined in a mating surface 3Laf of the front side wall $3L_F$ that is elongate in the leftward and rightward directions, the mating surface 3Laf being part of an entire mating surface 3La of the lower cylinder head member 3L that is mated to the upper cylinder head member 3U. The groove 3Lv extends straight in the leftward and rightward directions.

The groove 3Lv extends in front of and across four plug insertion tubes 3vp from the right end of the mating surface 3Laf near the cam chain chamber 3c to the left end of the mating surface 3Laf in front of the leftmost plug insertion tube 3vp.

As illustrated in FIG. 32, the vertically extending fourth oil supply passage c4 is formed in the inner side wall 3Lc of the cam chain chamber 3c. A first branch oil supply passage d1 branched from the fourth oil supply passage c4 is connected to the right end of the groove 3Lv and held in fluid communication therewith.

Figure 33:
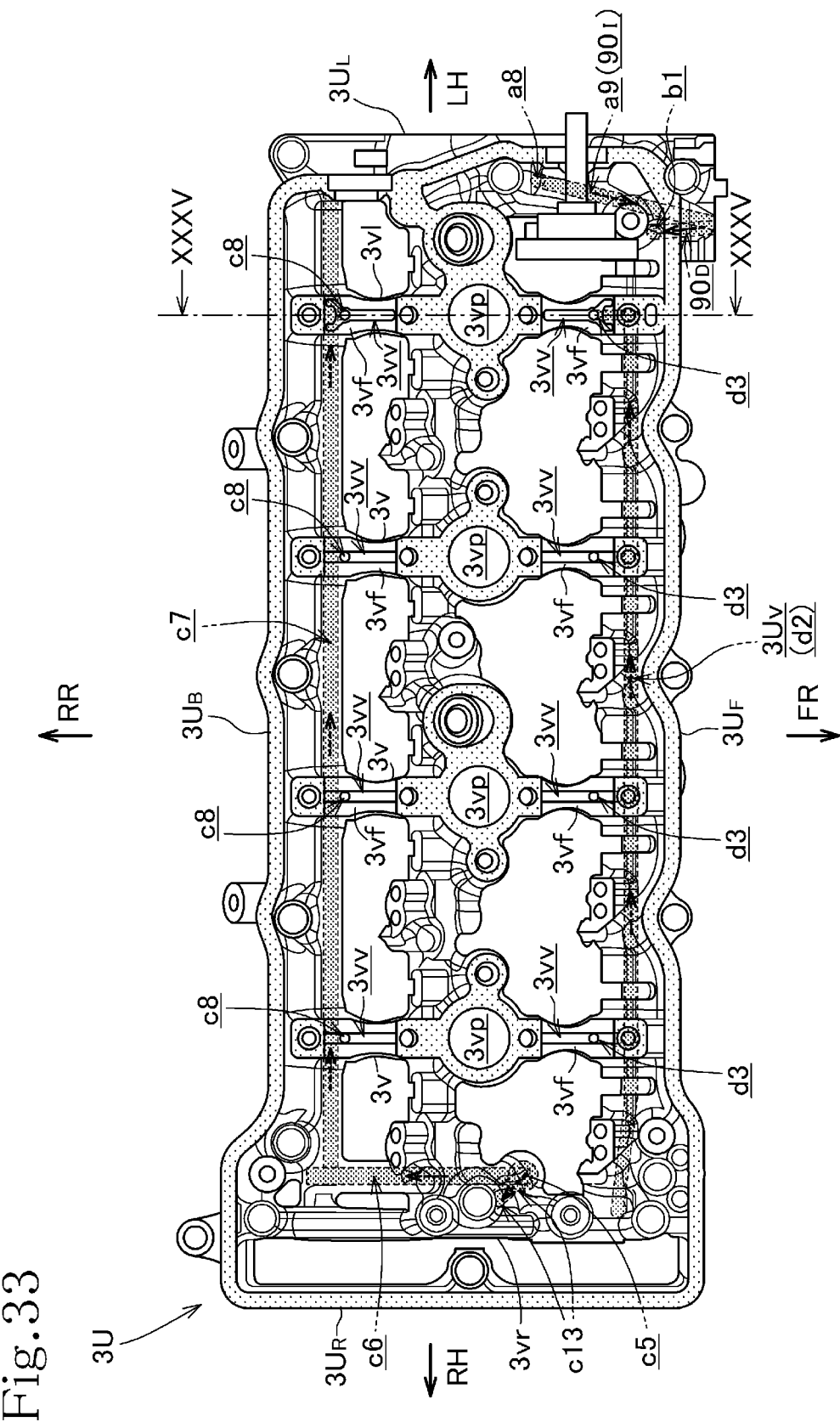
FIG. 33 is a plan view of an upper cylinder head member of the internal combustion engine illustrated in FIG. 32.
Figure 34:
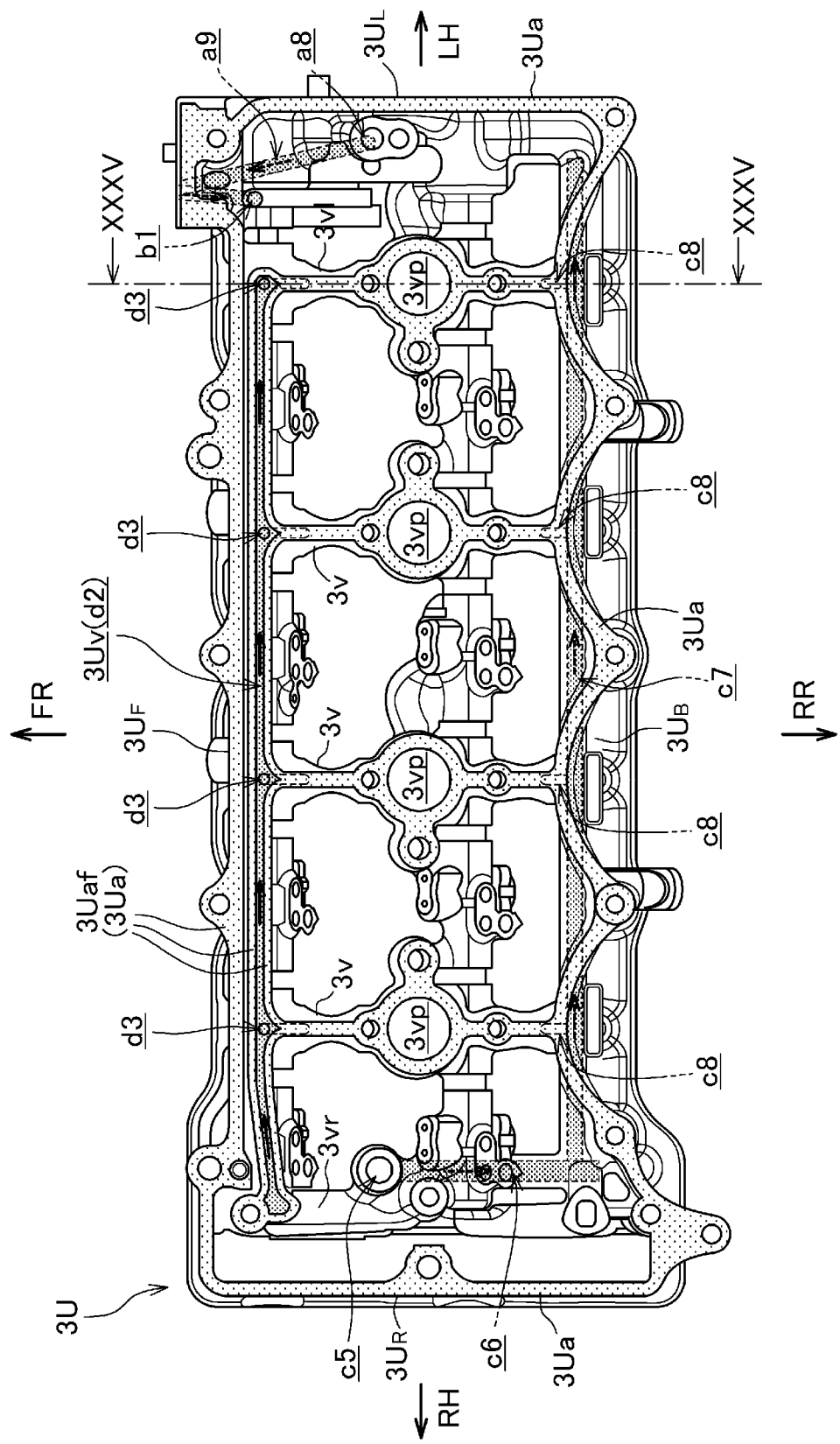
FIG. 34 is a bottom view of the upper cylinder head member illustrated in FIG. 33.

As illustrated in FIGS. 33 and 34, the upper cylinder head member 3U placed on the lower cylinder head member 3L is not provided with the joint oil passage tube Pc9 that interconnects the front side wall $3U_F$ and the rear side wall $3U_B$, but includes the fifth, sixth, seventh, and eighth oil supply passages c5, c6, c7, and c8. Further, the upper cylinder head member 3U is not provided with the ninth, tenth, eleventh, twelfth, and thirteenth oil supply passages c9, c10, c11, c12, and c13.

As illustrated in FIG. 34, the upper cylinder head member 3U has a groove 3Uv defined in a mating surface 3Uaf of the front side wall $3L_F$ that is elongate in the leftward and rightward directions, the mating surface 3Uaf being part of an entire mating surface 3Ua of the upper cylinder head member 3U that is mated to the lower cylinder head member 3L. The groove 3Uv extends straight in the leftward and rightward directions.

Figure 35:
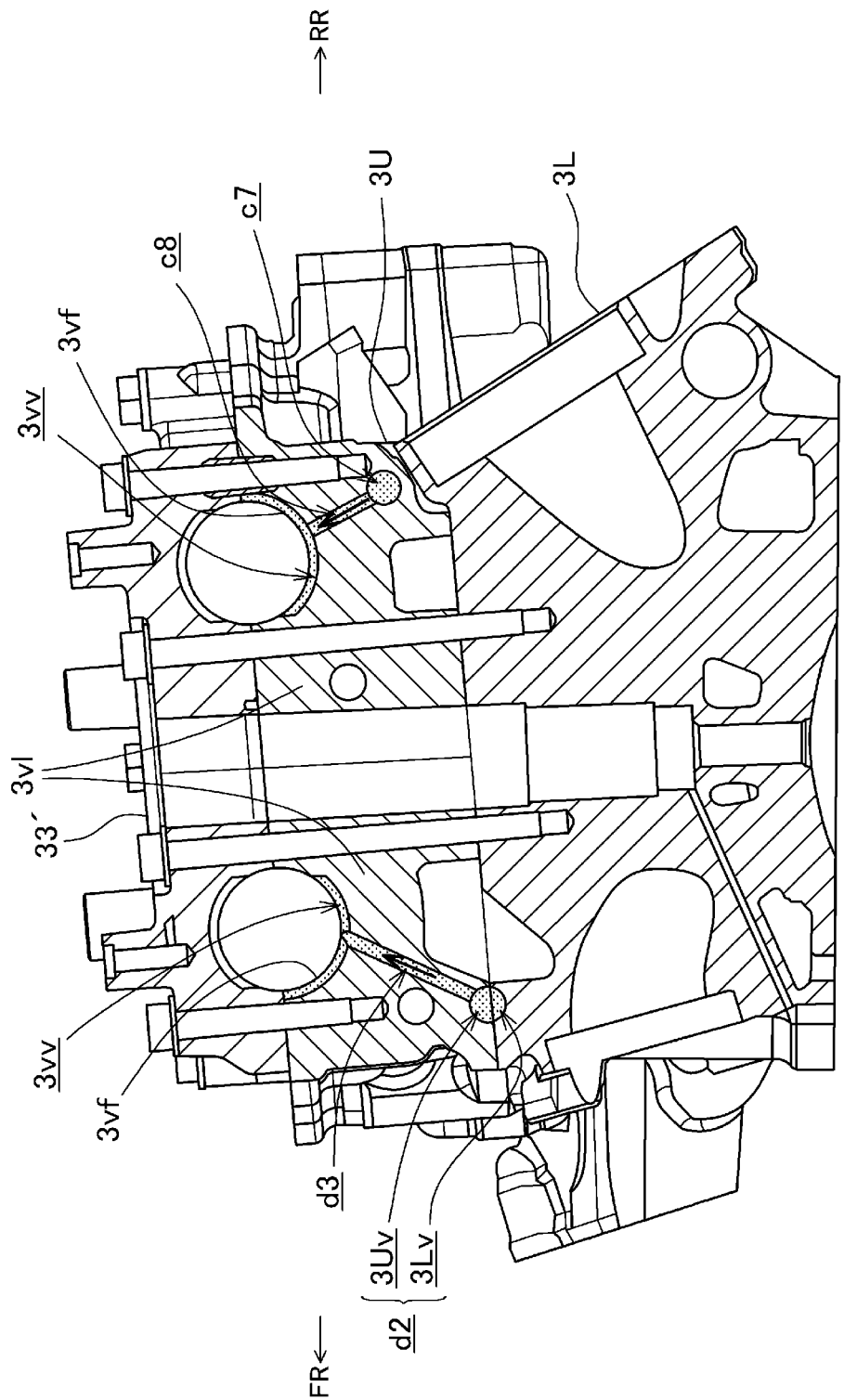
FIG. 35 is a sectional view of an assembly of a cylinder block, the lower cylinder head member, and the upper cylinder head member, taken along line XXXV-XXXV of FIGS. 32 through 34.

The mating surface 3Uaf of the front side wall $3L_F$ of the upper cylinder head member 3U is superposed on the mating surface 3Laf of the front side wall $3L_F$ of the lower cylinder head member 3L. The groove 3Uv in the mating surface 3Uaf and the groove 3Lv in the mating surface 3Laf face each other and are combined with each other, jointly making up a second branch oil supply passage d2, as shown in FIG. 35.

The second branch oil supply passage d2 is a second inter-bearing wall fluid communication oil passage extending from the right end of the grooves through the three bearing walls 3v to the leftmost bearing wall 3vl.

The second branch oil supply passage or the second inter-bearing wall fluid communication oil passage d2 is held in fluid communication with the first branch oil supply passageway d1 branched from the fourth oil supply passage c4. Oil that flows into the first branch oil supply passage d1 flows into the second branch oil supply passage or the second inter-bearing wall fluid communication oil passage d2.

As illustrated in FIG. 33, each of the four bearing walls, the three bearing walls 3v and the bearing wall 3vl, has front and rear semi-arcuate bearing surfaces 3vf disposed forward and rearward of the plug insertion tube 3vp. The semi-arcuate bearing surfaces 3vf have respective semi-arcuate grooves 3vv defined therein.

The intake camshaft 42 is rotatably supported by the rear bearing surfaces 3vf, and the exhaust camshaft 52 is rotatably supported by the front bearing surfaces 3vf.

As illustrated in FIG. 35, four eighth oil supply passages c8 branched and extending obliquely upward as bearing wall oil passages from the seventh oil supply passage or the inter-bearing wall fluid communication oil passage c7 have respective upper ends that are open in the semi-arcuate grooves 3vv in the four rear bearing surfaces or first bearing surfaces 3vf.

Four third oil supply passages d3 branched and extending obliquely upward as second bearing wall oil passages from the second branch oil supply passageway or the second inter-bearing wall fluid communication oil passage d2 have respective upper ends that are open in the semi-arcuate grooves 3vv in the four front bearing surfaces or first bearing surfaces 3vf.

Therefore, the rear bearing surfaces or first bearing surfaces 3vf of the four bearing walls, the three bearing walls 3v and the bearing wall 3vl, by which the intake camshaft 42 is rotatably supported, are supplied with oil that has flowed through the seventh oil supply passage or the inter-bearing wall fluid communication oil passage c7 defined in the rear side wall $3U_B$ closer to the rear bearing surfaces or first bearing surfaces 3vf and through the eighth oil supply passages c8 as the first bearing wall oil passages.

The front bearing surfaces or first bearing surfaces 3vf of the four bearing walls, the three bearing walls 3v and the bearing wall 3vl, by which the exhaust camshaft 52 is rotatably supported, are supplied with oil that has flowed through the second branch oil supply passage or the second inter-bearing wall fluid communication oil passage d2 that is defined by the combined mating surfaces 3Uaf and 3Laf of the front side walls $3U_F$ and $3L_F$ closer to the front bearing surfaces or first bearing surfaces 3vf and through the third branch oil supply passages d3 as the second bearing wall oil passages.

Therefore, the first and second bearing surfaces 3vf as the front and rear bearing surfaces of the four bearing walls, the three bearing walls 3v and the bearing wall 3vl, can be supplied with oil uniformly without localization and efficiently and can be lubricated thereby.

Since the grooves 3Uv and 3Lv that make up the second inter-bearing wall fluid communication oil passage d2 that provides fluid communication between the bearing walls for allowing oil to flow therebetween are defined respectively in the mating surfaces 3Uaf and 3Laf of the upper cylinder head member 3U and the lower cylinder head member 3L, which are vertically split members, of the cylinder head 3, the grooves 3Uv and 3Lv that make up the second inter-bearing wall fluid communication oil passage d2 can be formed as grooves at the time the upper cylinder head member 3U and the lower cylinder head member 3L are cast. Therefore, the oil passageways can be formed with ease.

As illustrated in FIG. 35, a camshaft holder 33' is superposed on the bearing wall 3vl. The camshaft holder 33' has semi-arcuate surfaces by which the camshafts are sandwiched and rotatably supported between the camshaft holder 33' and the bearing wall 3vl.

While the oil passageway structures for internal combustion engines according to the preferred embodiments of the present invention have been illustrated hereinbefore, the present invention is not limited to the illustrated embodiments, but various changes and modifications may be made therein without departing from the scope of the invention.

The engine bodies of the internal combustion engines according to the above embodiments are made up of the upper crankcase member 1U and the cylinder block 2 that are separate from each other. However, the present invention is also applicable to an engine body having an upper crankcase member 1U and a cylinder block 2 that are integral with each other.

The motorcycle that includes the power unit incorporating the oil passageway structure for internal combustion engines according to the present invention is not limited to the saddle-type motorcycle 100 according to the embodiment, but may be any of various saddle-type vehicles including scooter-type vehicles, three-wheeled or four-wheeled buggies, and so on, insofar as they are vehicles including the limitations recited in the claims.

REFERENCE SIGNS LIST

Pu . . . power unit, E . . . internal combustion engine, Eh . . . engine body, M . . . transmission, V . . . valley, a1 . . . first oil supply passageway, a2 . . . second oil supply passageway, a3 . . . third oil supply passageway, a4, a5 . . . fourth and fifth oil supply passageways, a6, a7, a8 . . . sixth, seventh, eighth oil supply passageway, a9 . . . ninth oil supply passageway, Pa3 . . . oil passageway tube, b1, b2, b3, b4 . . . first, second, third, fourth return oil passageway, c1, c2, c3, c4, c5, c6 . . . first, second, third, fourth, fifth, sixth oil supply passage, c7 . . . seventh oil supply passage or inter-bearing wall fluid communication oil passage, c8 . . . eighth oil supply passage or first bearing wall oil passage, c9 . . . ninth oil supply passageway or joint oil passage, c10 . . . tenth oil supply passage or side wall oil passage, c11 . . . eleventh oil supply passage, c12 . . . twelfth oil supply passage or second bearing wall oil passage, c13 . . . thirteenth oil supply passage, Pc9 . . . joint oil passage tube, d1 . . . first branch oil supply passage, d2 . . . second branch oil supply passage or second inter-bearing wall fluid communication oil passage, d3 . . . third branch oil supply passage or second bearing wall oil passage, 1 . . . crankcase, 1L . . . lower crankcase member, $1L_F$ . . . front wall, 1U . . . upper crankcase member, $1U_F$ . . . front wall, 1v . . . bent portion, $1U_L$ . . . left side wall, 2 . . . cylinder block, $2_F$ . . . cylinder front wall, $2_L$ . . . left side wall, 3 . . . cylinder head, 3L . . . lower cylinder head member, $3L_F$ . . . front side wall, 3La, 3Laf . . . mating surface, 3Lv . . . groove, 3U . . . upper cylinder head member, $3U_F$ . . . front side wall, $3U_B$ . . . rear side wall, $3U_L$ . . . left side wall, 3Ua, 3Uaf . . . mating surface, 3Uv . . . groove, $3U_{FL}$ ... left-end mating surface, $3v, 3vr, 3vl$ ... bearing wall, $3vf$ ... bearing surface, $3vv$ ... semi-arcuate groove, $3c$ ... cam chain chamber,
4 ... cylinder head cover, 5 ... oil pan, 7 ... stud bolt,
10 ... crankshaft, 11 ... main shaft, 12 ... countershaft,
20 ... oil pump, 21 ... oil filter,
30 ... combustion chamber, 33, 33' ... camshaft holder,
40 ... variable valve operating mechanism,
41 ... intake valve, 42 ... intake camshaft, 43 ... intake cam carrier, 43A ... high-speed cam lobe, 43B ... low-speed cam lobe, 43D ... lead-groove tubular portion, 44 ... lead groove set, 44c ... annular lead groove, 44l ... left shift lead groove, 44r ... right shift lead groove, 47 ... intake driven gear,
51 ... exhaust valve, 52 ... exhaust camshaft, 53 ... exhaust cam carrier, 53A ... high-speed cam lobe, 53B ... low-speed cam lobe, 53D ... lead-groove tubular portion, 54 ... lead groove set, 54c ... annular lead groove, 54l ... left shift lead groove, 54r ... right shift lead groove, 57 ... intake driven gear, 61 ... idle gear, 62 ... idle chain sprocket, 66 ... cam chain,
70 ... intake cam switching mechanism, 71 ... intake cam switching drive shaft, 72 ... intake rocker arm, Ca ... cam mechanism, 73 ... first switching pin, 74 ... second switching pin, 75 ... helical spring, 76 ... lid, 77 ... intake hydraulic actuator, 78 ... intake actuator housing, 79 ... intake actuator drive body, 79h ... oblong hole,
80 ... exhaust cam switching mechanism, 81 ... exhaust cam switching drive shaft, 82 ... exhaust rocker arm, Cb ... cam mechanism, 83 ... first switching pin, 84 ... second switching pin, 86 ... lid, 87 ... exhaust hydraulic actuator, 88 ... exhaust actuator housing, 89 ... exhaust actuator drive body, 89h ... oblong hole, $90_H$ ... high-speed supply/discharge oil passageway, $90_{HH}$ ... oblong groove, $90_L$ ... low-speed supply/discharge oil passageway, $90_{LL}$ ... oblong groove,
91 ... linear solenoid-operated valve, 92 ... electromagnetic solenoid, 92c ... electromagnetic coil, 92p ... plunger, 93 ... sleeve, 93R ... mating surface, $93_I$ ... hydraulic pressure supply port, $93_H$ ... high-speed supply/discharge port, $93_L$ ... low-speed supply/discharge port, $93_D$ ... drain port, 94 ... spool valve, $94_I$ ... hydraulic pressure supply groove, $94_D$ ... drain groove, 95 ... spring,
100 ... motorcycle, 102 ... head pipe, 103 ... main frame, 104 ... seal rail, 105 ... front fork, 106 ... front wheel, 107 ... pivot shaft, 108 ... swing arm, 109 ... rear wheel, 110 ... link mechanism, 111 ... rear cushion, 112 ... drive sprocket, 113 ... driven sprocket, 114 ... drive chain, 116 ... fuel tank, 117 ... main seat, 118 ... pillion seat, 121 ... throttle body, 122 ... air cleaner, 125 ... exhaust pipe.

The invention claimed is:

1. An oil passageway structure for an internal combustion engine having an engine body, comprising:
a cylinder head superposed on a cylinder block mounted on and extending upward from a crankcase and integrally fastened to the cylinder block;
at least two bearing walls extending between two facing side walls of the cylinder head;
a valve operating mechanism having two parallel camshafts rotatably supported along the two facing side walls by the bearing walls; and
oil passages defined in the engine body to supply oil to bearing surfaces of the at least two bearing walls of the cylinder head,
wherein the cylinder head has an inter-bearing wall fluid communication oil passage providing fluid communication between the at least two bearing walls for allowing oil to flow therebetween, and a bearing wall oil passage branched from the inter-bearing wall fluid communication oil passage to supply oil to the bearing surface of at least one of the bearing walls,
wherein the inter-bearing wall fluid communication oil passage is defined in one of the facing side walls,
wherein the bearing wall oil passage is formed in at least one of the at least two bearing walls,
wherein a joint oil passageway tube extends from one of the side walls, in which the inter-bearing wall fluid communication oil passage is formed, to the other side wall, and is integrally formed with both the side walls,
wherein a joint oil passage is branched from the inter-bearing wall fluid communication oil passage and formed in the joint oil passageway tube,
wherein a side wall oil passage extends from the joint oil passage to the bearing walls and is formed in the other side wall,
wherein the bearing wall oil passage functions as a first bearing wall oil passage,
wherein a second bearing wall oil passage for supplying oil from the side wall oil passage to the bearing surface, adjacent to the other side wall, of the bearing wall is defined in the bearing wall,
wherein two switching drive shafts which define swinging center axes of two rocker arms, the rocker arms swinging as the two camshafts rotate, are disposed at respective positions below the corresponding camshaft and close to the corresponding side wall,
wherein the cylinder head includes an upper cylinder head member and a lower cylinder head member which are vertically split from each other,
wherein the upper cylinder head member has the at least two bearing walls by which the two parallel camshafts are rotatably supported,
wherein the inter-bearing wall fluid communication oil passage is formed in the one of the side walls of the upper cylinder head member,
wherein a mating surface of the one of the side walls which is a part of an entire mating surface of the upper cylinder head member with the lower cylinder head member is formed in a curved shape so as to bulge in and out of the one of the side walls, and
wherein the inter-bearing wall fluid communication oil passage is provided at a position overlapping the mating surface of the curved shape in a bottom view of the upper cylinder head member.

2. The oil passageway structure for an internal combustion engine as claimed in claim 1, wherein the inter-bearing wall fluid communication oil passage is disposed below the bearing surfaces of the bearing wall.

3. The oil passageway structure for an internal combustion engine as claimed in claim 2, wherein the one of the side walls in which the inter-bearing wall fluid communication oil passage is defined is opposite the other side wall from which an exhaust pipe extends.

4. The oil passageway structure for an internal combustion engine as claimed in claim 2,
wherein the upper cylinder head member and the lower cylinder head member have respective mating surfaces on the other side wall which is opposite the one of the side walls in which the inter-bearing wall fluid communication oil passage is formed, the mating surfaces having grooves defined therein which make up a second inter-bearing wall fluid communication oil passage providing fluid communication between the bearing walls for allowing oil to flow therebetween; and wherein the bearing walls of the upper cylinder head member have second bearing wall oil passages defined therein which are branched from the second inter-bearing wall fluid communication oil passage to supply oil to the bearing surfaces of the bearing walls.

5. The oil passageway structure for an internal combustion engine as claimed in claim 2, wherein the two camshafts rotate with a power transmitted through driven gears mounted one end of each, and wherein oil is supplied to the bearing surface furthest from the driven gears among the bearing surfaces of the at least two bearing walls.

6. The oil passageway structure for an internal combustion engine as claimed in claim 1, wherein the one of the side walls in which the inter-bearing wall fluid communication oil passage is defined is opposite the other side wall from which an exhaust pipe extends.

7. The oil passageway structure for an internal combustion engine as claimed in claim 6, wherein the upper cylinder head member and the lower cylinder head member have respective mating surfaces on the other side wall which is opposite the one of the side walls in which the inter-bearing wall fluid communication oil passage is formed, the mating surfaces having grooves defined therein which make up a second inter-bearing wall fluid communication oil passage providing fluid communication between the bearing walls for allowing oil to flow therebetween; and wherein the bearing walls of the upper cylinder head member have second bearing wall oil passages defined therein which are branched from the second inter-bearing wall fluid communication oil passage to supply oil to the bearing surfaces of the bearing walls.

8. The oil passageway structure for an internal combustion engine as claimed in claim 6, wherein the two camshafts rotate with a power transmitted through driven gears mounted one end of each, and wherein oil is supplied to the bearing surface furthest from the driven gears among the bearing surfaces of the at least two bearing walls.

9. The oil passageway structure for an internal combustion engine as claimed in claim 1, wherein the valve operating mechanism includes:

camshafts rotatably mounted in the cylinder head and extending in leftward and rightward directions of a vehicle that incorporates the oil passageway structure;

cam carriers including tubular members fitted axially slidably, but relatively non-rotatably, over the camshafts and having a plurality of axially adjacent cam lobes of different cam profiles, and tubular portions adjacent to the cam lobes on outer circumferential surfaces of the cam carriers; and cam switching mechanisms for axially moving the cam carriers to switch the cam lobes for acting on engine valves, wherein the joint oil passage tube is disposed below the tubular portions of the cam carriers.

10. The oil passageway structure for an internal combustion engine as claimed in claim 9, wherein the two camshafts rotate with a power transmitted through driven gears mounted one end of each, and wherein oil is supplied to the bearing surface furthest from the driven gears among the bearing surfaces of the at least two bearing walls.

11. The oil passageway structure for an internal combustion engine as claimed in claim 1, wherein the upper cylinder head member and the lower cylinder head member have respective mating surfaces on the other side wall which is opposite the one of the side walls in which the inter-bearing wall fluid communication oil passage is formed, the mating surfaces having grooves defined therein which make up a second inter-bearing wall fluid communication oil passage providing fluid communication between the bearing walls for allowing oil to flow therebetween; and wherein the bearing walls of the upper cylinder head member have second bearing wall oil passages defined therein which are branched from the second inter-bearing wall fluid communication oil passage to supply oil to the bearing surfaces of the bearing walls.

12. The oil passageway structure for an internal combustion engine as claimed in claim 11, wherein the two camshafts rotate with a power transmitted through driven gears mounted one end of each, and wherein oil is supplied to the bearing surface furthest from the driven gears among the bearing surfaces of the at least two bearing walls.

13. The oil passageway structure for an internal combustion engine as claimed in claim 1, wherein the two camshafts rotate with a power transmitted through driven gears mounted one end of each; and wherein oil is supplied to the bearing surface furthest from the driven gears among the bearing surfaces of the at least two bearing walls.

* * * * *